(12) United States Patent
Kitazato

(10) Patent No.: US 9,226,026 B2
(45) Date of Patent: Dec. 29, 2015

(54) RECEPTION APPARATUS, RECEPTION METHOD, PROGRAM AND INFORMATION PROCESSING SYSTEM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 13/587,975

(22) Filed: Aug. 17, 2012

(65) Prior Publication Data
US 2013/0212634 A1    Aug. 15, 2013

Related U.S. Application Data

(60) Provisional application No. 61/526,938, filed on Aug. 24, 2011.

(51) Int. Cl.
| | |
|---|---|
| H04N 7/173 | (2011.01) |
| H04N 7/10 | (2006.01) |
| H04N 7/025 | (2006.01) |
| H04N 21/45 | (2011.01) |
| H04N 21/43 | (2011.01) |
| H04N 21/6543 | (2011.01) |
| H04N 21/858 | (2011.01) |

(52) U.S. Cl.
CPC ........... *H04N 21/45* (2013.01); *H04N 21/4307* (2013.01); *H04N 21/6543* (2013.01); *H04N 21/858* (2013.01)

(58) Field of Classification Search
CPC .............. H04N 21/4307; H04N 21/45; H04N 21/6543; H04N 21/858
USPC ................................................ 725/32, 34–36
See application file for complete search history.

(56) References Cited

U.S. PATENT DOCUMENTS

| | | | |
|---|---|---|---|
| 5,931,908 A * | 8/1999 | Gerba et al. ................... | 709/219 |
| 2001/0046069 A1 | 11/2001 | Jones | |
| 2002/0033844 A1 | 3/2002 | Levy et al. | |
| 2002/0062382 A1 | 5/2002 | Rhoads et al. | |
| 2003/0187798 A1 | 10/2003 | McKinley et al. | |
| 2003/0229900 A1 * | 12/2003 | Reisman .......................... | 725/87 |

(Continued)

FOREIGN PATENT DOCUMENTS

| | | | |
|---|---|---|---|
| JP | 2004-112522 A | 4/2004 | |
| JP | 2005-510145 A | 4/2005 | |

(Continued)

OTHER PUBLICATIONS

International Search Report Issued Sep. 25, 2012 in PCT/JP2012/070685 (with English translation).

(Continued)

*Primary Examiner* — Hai V Tran
*Assistant Examiner* — Jen-Shi Huang
(74) *Attorney, Agent, or Firm* — Oblon, McClelland, Maier & Neustadt, L.L.P.

(57) ABSTRACT

A reception apparatus includes: a reception section adapted to receive an AV content; a trigger extraction section adapted to extract trigger information transmitted together with the AV content for rendering an application program, which is to be executed in a linked relationship with the AV content, operative; a command acquisition section adapted to acquire a command for controlling the operation of the application program in response to the extracted trigger information; and a control section adapted to control the operation of the application program in response to the acquired command.

15 Claims, 18 Drawing Sheets

(56) References Cited

U.S. PATENT DOCUMENTS

| | | |
|---|---|---|
| 2005/0015796 A1* | 1/2005 | Bruckner et al. ............ 725/32 |
| 2005/0015802 A1 | 1/2005 | Masson |
| 2005/0192933 A1 | 9/2005 | Rhoads et al. |
| 2007/0055689 A1 | 3/2007 | Rhoads et al. |
| 2008/0049971 A1 | 2/2008 | Ramos et al. |
| 2008/0082618 A1 | 4/2008 | Jones |
| 2008/0275906 A1 | 11/2008 | Rhoads et al. |
| 2009/0138484 A1 | 5/2009 | Ramos et al. |
| 2009/0320073 A1* | 12/2009 | Reisman ...................... 725/51 |
| 2011/0075990 A1 | 3/2011 | Eyer |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |

FOREIGN PATENT DOCUMENTS

| | | |
|---|---|---|
| JP | 2006-245653 | 9/2006 |
| JP | 2010-182323 A | 8/2010 |
| WO | WO 03/036969 | 5/2003 |
| WO | WO 2011/074218 | 6/2011 |

OTHER PUBLICATIONS

U.S. Appl. No. 13/304,126, filed Nov. 23, 2011, Eyer.
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/562,946, filed Jul. 31, 2012, Eyer.
U.S. Appl. No. 13/559,166, filed Jul. 26, 2012, Eyer.
U.S. Appl. No. 13/490,216, filed Jun. 6, 2012, Eyer.
U.S. Appl. No. 13/554,688, filed Jul. 20, 2012, Eyer.
U.S. Appl. No. 13/559,188, filed Jul. 26, 2012, Kitazato.
U.S. Appl. No. 13/527,435, filed Jun. 19, 2012, Eyer.
Extended European Search Report issued Dec. 22, 2014 in European Patent Application No. 12825734.2.

\* cited by examiner

TWO-DIMENSIONAL BAR CODE
→TRIGGER INFORMATION

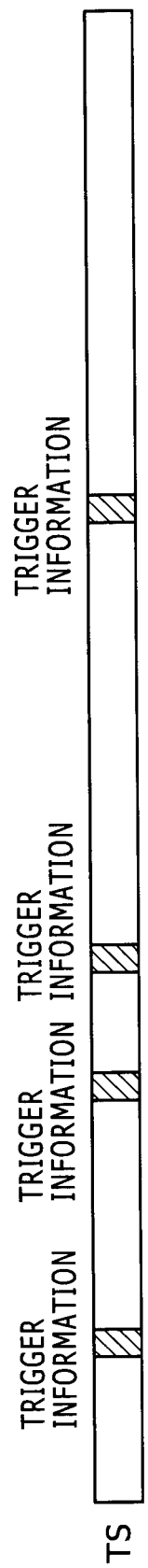

FIG. 7

| ITEM NAME | DESCRIPTION |
|---|---|
| TRIGGER ID | ID FOR IDENTIFYING THE TRIGGER INFORMATION. THE RECEPTION APPARATUS MAY CARRY OUT PROCESSING ONLY ONCE FOR TRIGGER INFORMATION OF THE SAME TRIGGER ID. |
| SOURCE ID TYPE | 1: CHANNEL<br>2: CONTENT |
| SOURCE ID | CHANNEL IDENTIFICATION INFORMATION FOR THE SOURCE ID TYPE 1<br>CONTENT IDENTIFICATION INFORMATION FOR THE SOURCE ID TYPE 2 |
| MEDIUM TIME TYPE | 1: RELATIVE TIME<br>2: ABSOLUTE DATE AND TIME<br>3: PTS |
| MEDIUM TIME | INFORMATION REPRESENTATIVE OF TEMPORAL INSERTION POSITION OF TRIGGER INFORMATION BASED ON THE MEDIUM TIME TYPE. |

F I G. 8

| INFORMATION ITEM | SUBSTANCE |
|---|---|
| COMMAND ID | ID FOR IDENTIFYING A PARTICULAR COMMAND |
| COMMAND EFFECTUATION TIME | REPRESENTED BY ONE OF ABSOLUTE DATE AND TIME, RELATIVE TIME, AND PTS INDICATIVE OF TIME AT WHICH THE COMMAND IS TO BE EXECUTED. THE COMMAND IS EFFECTUATED IMMEDIATELY IF THE TIME PASSES BY. |
| COMMAND OBJECT APPARATUS TYPE | OBJECT APPARATUS OF APPLICATION CONTROL BY THE COMMAND. "RECEPTION APPARATUS MAIN BODY", "EXTERNAL APPARATUS TYPE 1", "EXTERNAL APPARATUS TYPE 2".... |
| COMMAND ACTION | INDICATES A TERMINAL ACTION BY THE COMMAND. FIVE TYPES OF "APPLICATION ACQUISITION", "APPLICATION START-UP", "APPLICATION END", "EVENT FIRING" AND "APPLICATION INTERRUPTION" |
| COMMAND APPLICATION DISPERSION PARAMETER | PARAMETER FOR STOCHASTICALLY DISPERSING THE TIMING AT WHICH THE COMMAND IS TO BE APPLIED BY THE OBJECT APPARATUS. INTENDED FOR ACCESS DISPERSION TO THE SERVER. |
| APPLICATION ID | ID OF THE OBJECT APPLICATION |
| APPLICATION TYPE | TYPE OF THE APPLICATION |
| BUSINESS FIRM ID | ID REPRESENTATIVE OF THE BUSINESS FIRM (UNNECESSARY IF INCLUDED IN THE APPLICATION ID) |
| APPLICATION URL | ACQUISITION DESTINATION URL OF THE APPLICATION |
| APPLICATION EXPIRATION DATE | EXPIRATION DATE AND TIME AT WHICH THE APPLICATION IS TO BE DELETED |
| APPLICATION RETENTION PRIORITY DEGREE | PRIORITY DEGREE OF RETENTION WHEN THE APPLICATION RETENTION CAPACITY BECOMES SHORT |
| EVENT ID | EVENT ID IN THE CASE OF "EVENT FIRING" |
| EVENT ADDITION DATA | DATA UTILIZED BY THE APPLICATION UPON EVENT FIRING IN THE CASE OF "EVENT FIRING" |

FIG. 9

| FACTOR (ATTRIBUTE) | | NUMBER OF APPEARANCES | DEFINITION AND DETAILED PRACTICAL USE |
|---|---|---|---|
| command | | 1 | COMMAND APPLICATION APPARATUS |
| | @destination | 1 | COMMAND APPLICATION APPARATUS<br>"receiver" : RECEPTION APPARATUS MAIN BODY<br>"external_1" EXTERNAL APPARATUS TYPE 1<br>"external_2" EXTERNAL APPARATUS TYPE 2 |
| | @action | 1 | COMMAND SUBSTANCE<br>"execute" EXECUTION OF APPLICATION, "register" REGISTRATION OF APPLICATION, "suspend" INTERRUPTION OF APPLICATION, "terminate" END OF APPLICATION, "event" FIRING OF EVENT |
| timing | | 0..1 | DETAILED DESIGNATION OF COMMAND APPLICATION TIMING |
| | @unit | 1 | TIMING DESIGNATION METHOD<br>"utc" ABSOLUTE DATE AND TIME, "smpte" RELATIVE TIME,<br>"pts" BROADCASTING PTS VALUE |
| diffusion | | 0..1 | DIFFUSION OF COMMAND APPLICATION TIMING |
| | @rate | 1 | DISTRIBUTION NUMBER |
| | @range | 1 | MAXIMUM DELAY TIME |
| | @period | 1 | COMMAND APPLICATION DIFFUSION PERIOD |

FIG.10

| FACTOR (ATTRIBUTE) | | | NUMBER OF APPEARANCES | DEFINITION AND DETAILED PRACTICAL USE |
|---|---|---|---|---|
| application | | | 1 | DESCRIPTION OF OBJECT APPLICATION |
| | @id | | 1 | APPLICATION ID |
| | @type | | 1 | APPLICATION TYPE |
| | @url | | 0..1 | APPLICATION ACQUISITION DESTINATION URL, ESSENTIALLY REQUIRED IN "execute", "register" |
| | @priority | | 0..1 | APPLICATION RETENTION PRIORITY DEGREE 1:High 0:Normal |
| | @expire_date | | 0..1 | APPLICATION EXPIRATION DATE, ESSENTIALLY REQUIRED IN "execute", "register" |
| event | | | 0..1 | APPLICATION EVENT, ESSENTIALLY REQUIRED IN "event" |
| | @id | | 1 | EVENT ID |
| | data | | 0..1 | DATA TO BE INPUTTED TO APPLICATION IN RELATION TO EVENT |

FIG.11

```
<command destination="receiver" action="execute">
  <timing unit="pts"> 1286743</timing>
  <application id="1" type="html" url="xxx.com/yyy" expire_date="2011-01-21">
</command>
<command destination="receiver" action="event">
  <timing unit="pts"> 1288203</timing>
  <application id="1"/>
  <event id="event1">
    <data>zzzzzz・・・・z</data>
  </event>
</command>
```

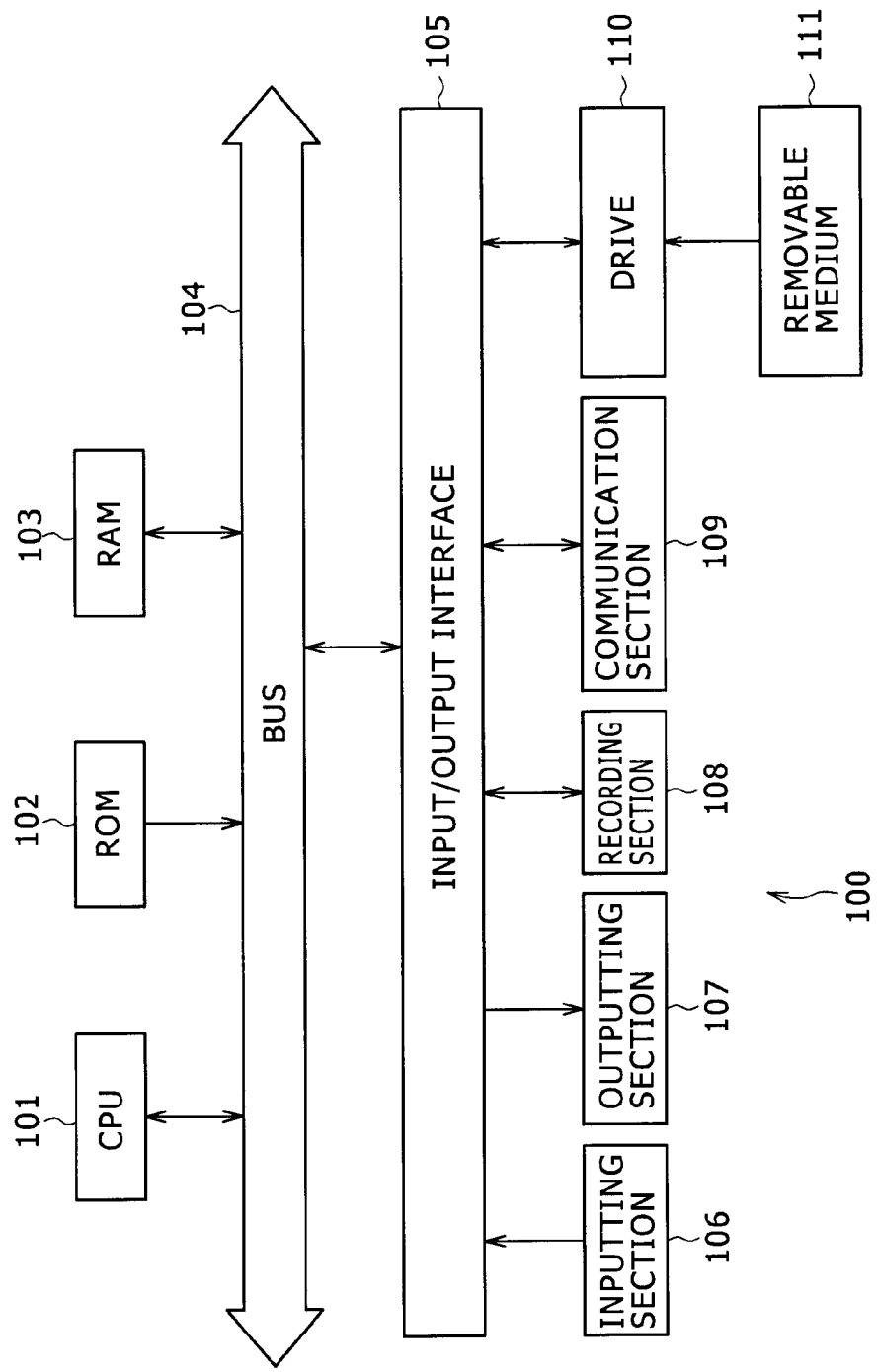

RECEPTION APPARATUS, RECEPTION METHOD, PROGRAM AND INFORMATION PROCESSING SYSTEM

CROSS-REFERENCE TO RELATED APPLICATION

This application claims the benefit of priority of Provisional Application Ser. No. 61/526,938, filed on Aug. 24, 2011, the entire contents of which is incorporated herein by reference.

BACKGROUND

The technology disclosed herein relates to a reception apparatus, a reception method, a program and an information processing system. In particular, the technology relates to a reception apparatus, a reception method, a program and an information processing system which can provide an application program which is executed in a linked relationship with an AV content such as a digital television program.

It is expected that a service by a reception apparatus, which receives a digital television broadcasting signal, of acquiring and executing an application program linked with a digital television program is popularized. Investigations for the technology for implementing such a hybrid service which combines broadcasting and communication as just described are proceeding (refer to, for example, Japanese Patent Laid-Open No. 2006-245653).

SUMMARY

Incidentally, in the case where a reception apparatus receives a digital television broadcasting signal not directly but through a broadcasting transmission line such as a CATV network or a satellite communication network, in order to implement a service of executing an application program linked with a digital television program, information relating to the service is conveyed to the reception apparatus through a broadcasting transmission line and a terminal for exclusive use.

Thereupon, installation of the broadcasting transmission line and modification to the terminal for exclusive use are involved, and a license of a broadcasting organization which carries out repeating is demanded. Therefore, it is desirable to make it possible to provide an application program which is executed in a linked relationship with a digital television program without the necessity to carry out such works. At present, however, a technological system for providing an application program to be executed in a linked relationship with a digital television program has not been established.

The present technology has been made in order to solve the problems described above, and it is therefore desirable to provide an application program which is executed in a linked relationship with an AV content such as a digital television program.

According to an embodiment of the disclosed technology, there is provided a reception apparatus including: a reception section adapted to receive an AV content; a trigger extraction section adapted to extract trigger information transmitted together with the AV content for rendering an application program, which is to be executed in a linked relationship with the AV content, operative; a command acquisition section adapted to acquire a command for controlling the operation of the application program in response to the extracted trigger information; and a control section adapted to control the operation of the application program in response to the acquired command.

The command may indicate one of acquisition or registration, acquisition or start-up, event firing, suspension and termination of the application program, and the control section may control, in response to the command, acquisition or registration, or acquisition or start-up, of the application program, or event firing, suspension or termination of the application program being executed.

The command may include time information indicative of time at which the command is to be executed, and the control section may execute the command in response to the time information.

The time information may be information for allowing the command to be executed when particular time determined in advance comes independently of the progress of the AV content or information for allowing the command to be executed when particular time determined in advance in a linked relationship with the progress of the AV content passes.

The reception apparatus may be configured such that, when the command indicates acquisition or start-up and the application program is not acquired as yet, the control section starts up, after the control section acquires the application program, the acquired application program when the time at which the command is to be executed comes.

The trigger information may include identification information for identifying the AV content and time position information regarding a temporal insertion position of the trigger information in the AV content, and the command acquisition section may acquire the command specified by the identification information and the time position information.

The reception apparatus may further include a transmission section adapted to transmit identification information for identifying the reception apparatus side to an information processing apparatus which provides the command, the command acquisition section acquiring the command in response to the identification information from the information processing apparatus.

The reception apparatus may further include a transmission section adapted to transmit identification information for identifying the reception apparatus side to an information processing apparatus which provides the application program, the control section controlling the acquisition of the application program in response to the identification information from the information processing apparatus.

The reception apparatus may further include a specification information acquisition section adapted to acquire specification information for specifying an information processing apparatus, which provides the command, in response to the extracted trigger information, the command acquisition section accessing the information processing apparatus, which is specified by the acquired specification information, to acquire the command.

The reception apparatus may be an independent apparatus or may be an internal block which composes one apparatus.

A reception method and a program according to the embodiment of the present technology are a reception method and a program which correspond to the reception apparatus according to the embodiment of the present technology described above.

In the reception apparatus, reception method and program according to the embodiment of the present technology, an AV content is received, and trigger information transmitted together with the AV content for rendering an application program, which is to be executed in a linked relationship with the AV content, operative is extracted. Then, a command for controlling operation of the application program in response to the extracted trigger information is acquired, and the operation of the application program is controlled in response to the acquired command.

According to another embodiment of the disclosed technology, there is provided an information processing system including a reception apparatus adapted to receive an AV content, a first information processing apparatus adapted to specify an acquisition destination of a command for controlling operation of an application program to be executed in a linked relationship with the AV content, a second information processing apparatus adapted to provide the command, and a third information processing apparatus adapted to provide the application program. The reception apparatus includes a reception section adapted to receive the AV content, a trigger extraction section adapted to extract trigger information transmitted together with the AV content for rendering the application program operative, a specification information acquisition section adapted to acquire specification information for specifying the second information processing apparatus from the first information processing apparatus in response to the extracted trigger information, a command acquisition section adapted to access the second information processing apparatus specified by the specification information acquired from the first information processing apparatus to acquire the command, and a control section adapted to control the operation of the application program acquired from the third information processing apparatus in response to the command acquired from the second information processing apparatus. The first information processing apparatus includes a first provision section adapted to provide the specification information in response to an inquiry from the reception apparatus, the second information processing apparatus includes a second provision section adapted to provide the command, and the third information processing apparatus includes a third provision section adapted to provide the application program in response to the command.

In the information processing system, an AV content is received and trigger information transmitted together with the AV content for rendering an application program operative is extracted by the reception apparatus. Then, specification information for specifying the second information processing apparatus is acquired from the first information processing apparatus in response to the extracted trigger information by the reception apparatus. Then, the second information processing apparatus specified by the specification information acquired from the first information processing apparatus is accessed by the reception apparatus to acquire the command. Then, the operation of the application program acquired from the third information processing apparatus is controlled in response to the command acquired from the second information processing apparatus by the reception apparatus. The specification information is provided in response to an inquiry from the reception apparatus by the first information processing apparatus. Further, the command is provided in response to an inquiry from the reception apparatus by the second information processing apparatus. Further, the application program is provided in accordance with the command in response to an inquiry from the reception apparatus by the third information processing apparatus.

According to the technology disclosed herein, an application program which is executed in a linked relationship with an AV content such as a digital television program can be provided.

BRIEF DESCRIPTION OF THE DRAWINGS

FIG. 5 is a diagrammatic view illustrating a concept of transmission of a PCR packet in which trigger information is included;

FIG. 7 is a view illustrating an example of items included in trigger information;

FIG. 8 is a view illustrating an example of items of information included in a command;

FIG. 9 is a view illustrating detailed specifications of a command;

FIG. 10 is a view illustrating detailed specifications of a command;

FIG. 11 is a view illustrating an example of description of a command;

FIG. 18 is a block diagram showing an example of a configuration of a computer.

DETAILED DESCRIPTION OF THE PREFERRED EMBODIMENTS

In the following, preferred embodiments of the disclosed technology are described with reference to the accompanying drawings.

First Embodiment

[Example of the Configuration of the Broadcasting System]

Figure 1:
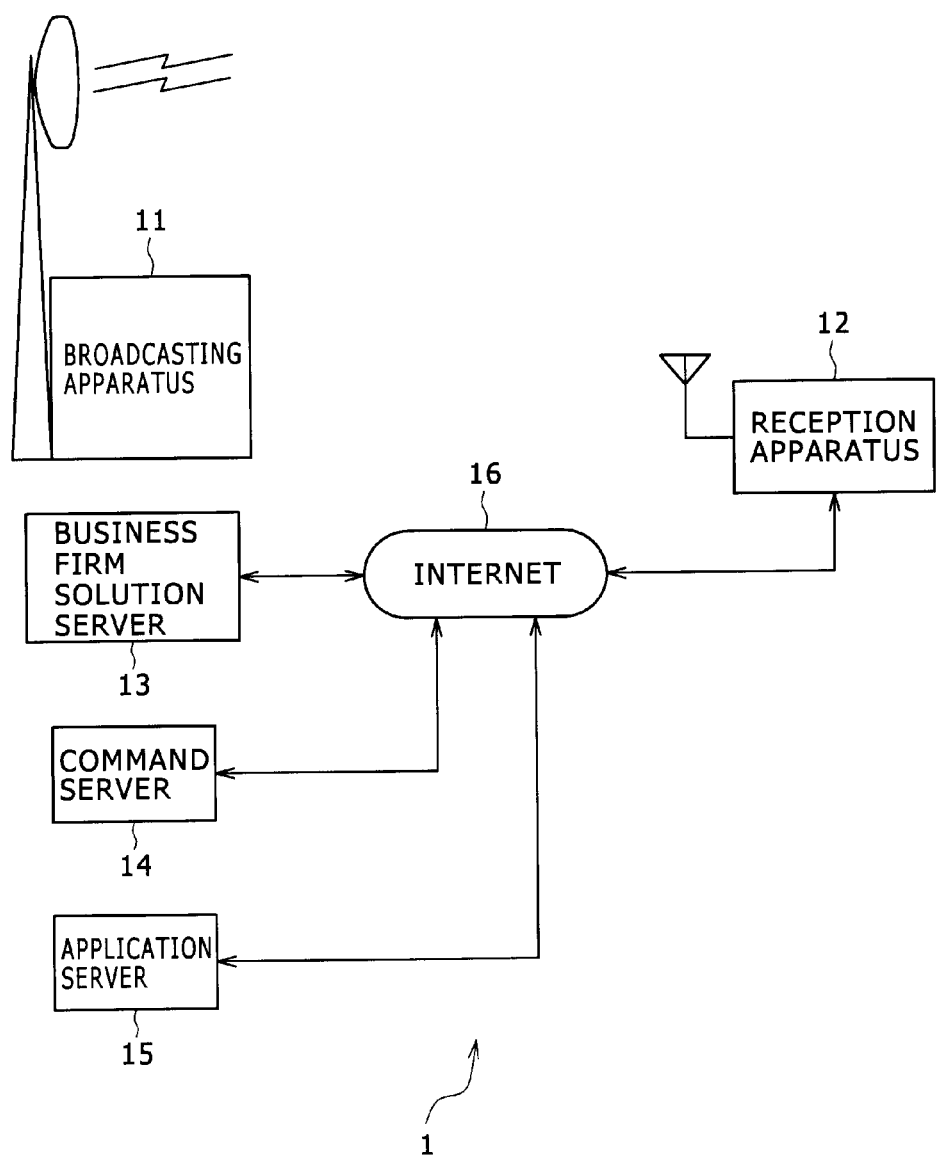
FIG. 1 is a block diagram showing an example of a configuration of a broadcasting system.

FIG. 1 shows a broadcasting system 1 according to a first embodiment of the disclosed technology. The broadcasting system 1 includes a broadcasting apparatus 11, a reception apparatus 12, a business firm solution server 13, a command server 14, and an application server 15. The reception apparatus 12, business firm solution server 13, command server 14 and application server 15 are connected to each other through the Internet 16.

The broadcasting apparatus 11 transmits a digital television broadcasting signal of an AV content of a digital television program, a CM or the like. It is to be noted that, in the following description, a digital television program is described as an example of the AV content.

Further, the broadcasting apparatus 11 transmits a digital television broadcasting signal into which trigger information for rendering a data broadcasting application, which is executed in a linked relationship with a digital television program, operative. Here, the data broadcasting application is an application program for data broadcasting which is executed in a linked relationship with a digital television program.

Meanwhile, the trigger information is transmitted after it is inserted into a video signal or an audio signal of a digital television program or placed into a transport stream (Transport Stream, hereinafter referred to as TS) of a digital television broadcasting signal. It is to be noted that details of the trigger information are hereinafter described with reference to FIGS. 4A to 7.

The reception apparatus 12 receives a digital television broadcasting signal transmitted thereto from the broadcasting apparatus 11 to acquire an image and sound of a digital television program. The reception apparatus 12 outputs the acquired image to a monitor and outputs the acquired sound to a speaker.

It is to be noted that the reception apparatus 12 may be provided as a sole apparatus or may be built, for example, in a television receiver or a video recorder. A detailed configuration of the reception apparatus 12 is hereinafter described with reference to FIG. 2.

Further, the reception apparatus 12 accesses the business firm solution server 13 through the Internet 16 in response to trigger information to inquire about an acquisition destination of a command for controlling operation of the data broadcasting application.

The business firm solution server 13 manages command server specification information. Here, the command server specification information is information for specifying the command server 14 which provides a command for controlling operation of the data broadcasting application provided by a business firm which serves as a providing source of a digital television broadcast. The business firm solution server 13 provides command server specification information to the reception apparatus 12 through the Internet 16 in response to an inquiry from the reception apparatus 12.

The reception apparatus 12 accesses the command server 14 through the Internet 16 in response to command server specification information acquired from the business firm solution server 13 to acquire a command for controlling the operation of the data broadcasting application.

The command server 14 manages a command for controlling operation of the data broadcasting application. The command server 14 provides a command to the reception apparatus 12 through the Internet 16 in response to an inquiry from the reception apparatus 12.

The reception apparatus 12 controls operation of the data broadcasting application in accordance with a command acquired from the command server 14. Further, the reception apparatus 12 accesses the application server 15 through the Internet 16 in response to a command received from the command server 14 to acquire the data broadcasting application.

The application server 15 manages the data broadcasting application which is executed in a linked relationship with a digital television program broadcast from the broadcasting apparatus 11. The application server 15 provides the data broadcasting application through the Internet 16 in response to an inquiry from the reception apparatus 12.

The broadcasting system 1 is configured in such a manner as described above.

[Example of the Configuration of the Reception Apparatus]

Figure 2:
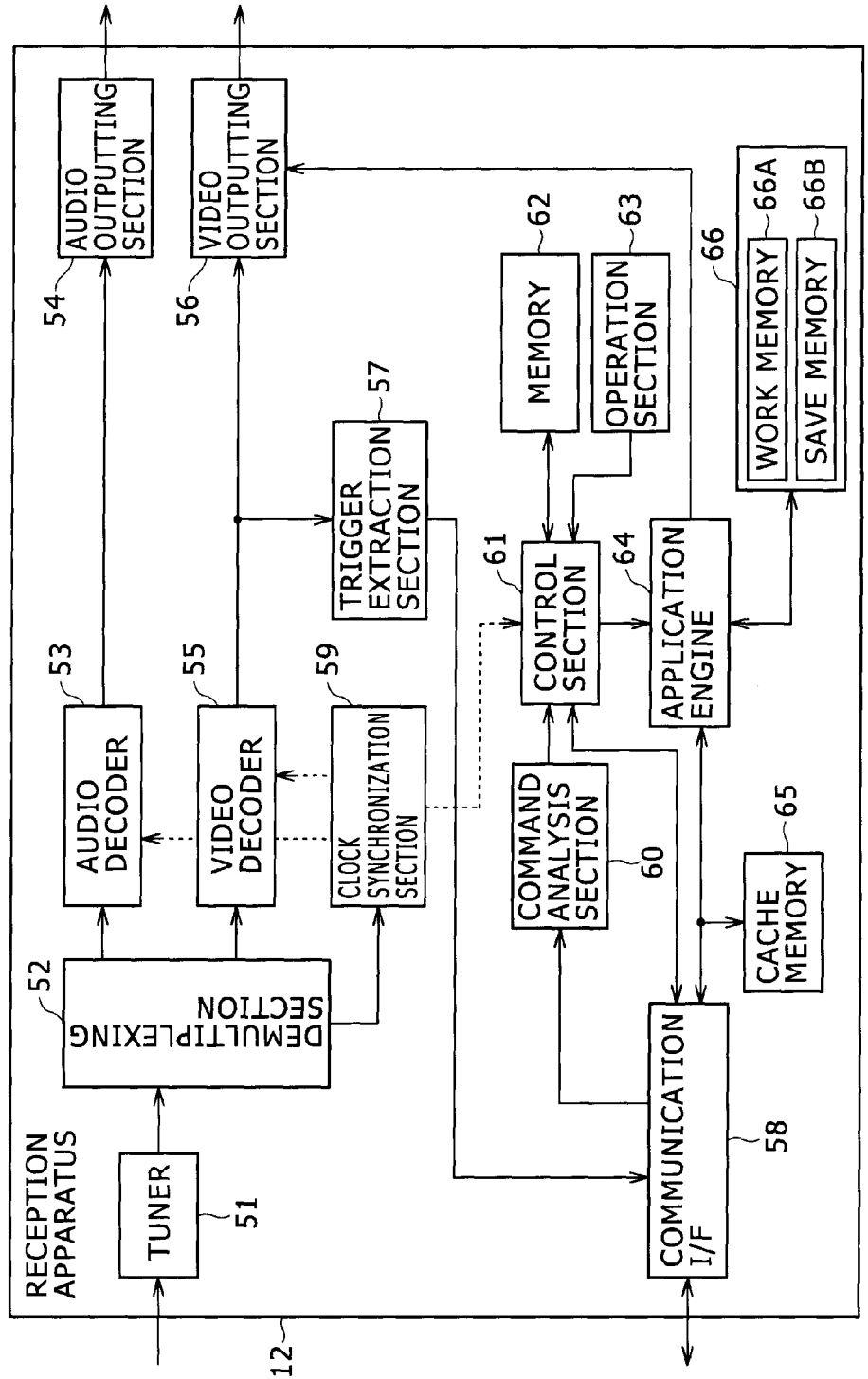
FIG. 2 is a block diagram showing an example of a configuration of a reception apparatus.

FIG. 2 shows an example of a configuration of the reception apparatus 12 of FIG. 1.

The reception apparatus 12 includes a tuner 51, a demultiplexing section 52, an audio decoder 53, an audio outputting section 54, a video decoder 55, a video outputting section 56, and a trigger extraction section 57. The reception apparatus further includes a communication I/F 58, a clock synchronization section 59, a command analysis section 60, a control section 61, a memory 62, an operation section 63, an application engine 64, a cache memory 65, and an application memory 66.

The tuner 51 receives and demodulates a digital television broadcasting signal corresponding to a channel selected by a user and outputs a TS obtained by the demodulation to the demultiplexing section 52.

The demultiplexing section 52 demultiplexes the TS inputted thereto from the tuner 51 into an audio coded signal and a video coded signal and outputs them to the audio decoder 53 and the video decoder 55, respectively. Further, the demultiplexing section 52 extracts a PCR (Program Clock Reference) from a TS packet which configures the TS, and supplies the PCR to the clock synchronization section 59.

The audio decoder 53 decodes the audio coded signal inputted thereto and outputs an audio signal obtained by the decoding to the audio outputting section 54. The audio outputting section 54 outputs the audio signal inputted thereto to the speaker at the succeeding stage.

The video decoder 55 decodes the video coded signal inputted thereto and outputs a video signal obtained by the decoding to the video outputting section 56 and the trigger extraction section 57. The video outputting section 56 outputs the video signal inputted thereto from the video decoder 55 to the monitor at the succeeding stage.

The trigger extraction section 57 normally supervises the video signal inputted thereto from the video decoder 55 to extract trigger information embedded in the video signal.

It is to be noted here that, although it is described as an example that trigger information is embedded in a video signal, in the case where trigger information is placed in a TS, the trigger extraction section 57 extracts trigger information from a PCR packet inputted thereto from the demultiplexing section 52 and including the trigger signal. On the other hand, in the case where trigger information is embedded in an audio signal, the trigger extraction section 57 normally supervises an audio signal inputted thereto from the audio decoder 53 to extract trigger information embedded in the audio signal.

The trigger extraction section 57 controls the communication I/F 58 in response to extracted trigger information to access the business firm solution server 13 through the Internet 16 to inquire about an acquisition designation of a command. The communication I/F 58 receives command server specification information transmitted thereto from the business firm solution server 13 and supplies the received command server specification to the control section 61.

The control section 61 executes a controlling program stored in advance in the memory 62 to control operation of the associated components of the reception apparatus 12. The controlling program to be executed by the control section 61 is stored in advance in the memory 62. This controlling program can be updated suitably based on a digital television broadcasting signal or updating data which is acquired through the Internet 16. The operation section 63 receives various operations from users and notifies the control section of operation signals corresponding to the various operations.

Further, the control section 61 acquires command server specification information from the communication I/F 58. The control section 61 controls the communication I/F 58 in response to the acquired command server specification information to access the command server 14 through the Internet 16 to inquire about a command. The communication I/F 58 receives a command transmitted thereto from the command server 14 and supplies the received command to the command analysis section 60.

The command analysis section 60 analyzes the command from the communication I/F 58 and supplies a result of the analysis to the control section 61.

The clock synchronization section 59 is configured, for example, a PLL (Phase Locked Loop) and supplies a system clock in accordance with a PCR from the demultiplexing section 52 to the associated components of the reception apparatus 12 such as the audio decoder 53, video decoder 55 and control section 61. Consequently, the reception apparatus 12 can reproduce an audio signal and a video signal because it can obtain a system clock synchronized with the broadcasting apparatus 11.

The control section 61 controls, based on the analysis result from the command analysis section 60, acquisition or registration, acquisition or start-up, event firing, suspension, termination and so forth of a data broadcasting application. Further, the control section 61 controls the timing of execution of a command with reference to the system clock from the clock synchronization section 59 based on the analysis result from the command analysis section 60.

The application engine 64 controls the communication I/F 58 under the control of the control section 61 to access the application server 15 through the Internet 16 to request for a data broadcasting application. The communication I/F 58 receives a data broadcasting application transmitted thereto from the application server 15 and retains the received data broadcasting application into the cache memory 65.

The application engine 64 reads out a data broadcasting application retained in the cache memory 65 and executes the data broadcasting application under the control of the control section 61. A video signal of the data broadcasting application being executed is supplied to the video outputting section 56.

The video outputting section 56 synthesizes a video signal inputted thereto from the application engine 64 and a video signal inputted from the video decoder 55 and outputs a resulting video signal to the monitor at the succeeding stage.

The application memory 66 includes a work memory 66A and a save memory 66B. The application engine 64 records data relating to a data broadcasting application being executed, particularly data including a hierarchy of information displayed, into the work memory 66A. Further, if the data broadcasting application being executed is to be rendered inoperative, then the application engine 64 moves data of the work memory 66A of the application memory 66 into the save memory 66B. Then, when the data broadcasting application rendered inoperative is to be re-started, the data of the save memory 66B are moved into the work memory 66A to restore the state before the data broadcasting application was rendered inoperative.

The reception apparatus 12 is configured in such a manner as described above.

[Operation of the Components of the Broadcasting System]

Now, operation of the components of the broadcasting system 1 is described with reference to FIG. 3.

Figure 3:
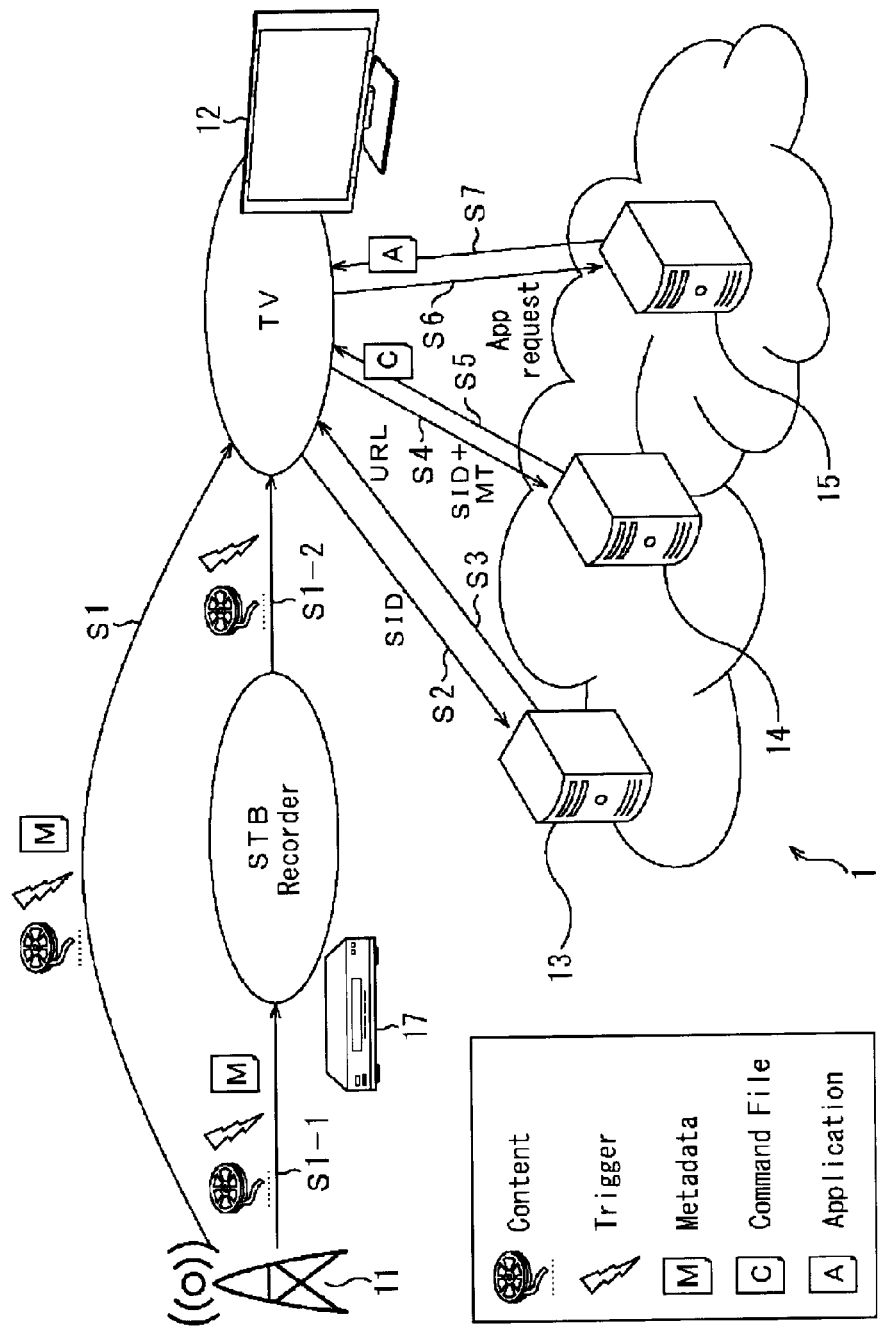
FIG. 3 is a schematic view illustrating operation of various apparatus which configure the broadcasting system.

In the broadcasting system 1 of FIG. 3, the broadcasting apparatus 11 transmits a digital television broadcasting signal of a digital television program, represented as "Content" in FIG. 3, including trigger information, represented as "Trigger" in FIG. 3. The digital television broadcasting signal further includes metadata, represented as "Metadata" in FIG. 3, relating to the digital television program.

In the case where the reception apparatus 12, represented as "TV" in FIG. 3, directly receives a digital television broadcasting signal from the broadcasting apparatus 11, it can acquire metadata included in the digital television broadcasting signal (S1). On the other hand, in the case where the reception apparatus 12 receives a digital television broadcasting signal from the broadcasting apparatus 11 through a CATV network or a satellite communication network, it receives a signal after conversion by a set top box 17, represented as "STB (Set Top Box) Recorder," through a HDMI (High Definition Multimedia Interface) (S1-1, S1-2). In this instance, only a digital television program and trigger information are outputted from the set top box 17, and the reception apparatus 12 cannot utilize metadata.

In particular, not only in the case where a digital television broadcasting signal is to be received directly (S1) but also in the case where it is received through the set top box 17 (S1-1, S1-2), the reception apparatus 12 can extract trigger information transmitted together with the digital television broadcasting signal. Then, the reception apparatus 12 transmits channel identification information of a digital television program currently selected, which is included in the extracted trigger information, to the business firm solution server 13 through the Internet 16 to inquire about an acquisition destination of a command (S2).

Here, the channel identification information is identification information for identifying the channel of a digital television program and corresponds to "source ID" in FIG. 7 hereinafter described. In FIG. 3, the channel identification information is represented as "SID," and the "SID" is transmitted to the business firm solution server 13.

It is to be noted that, in the reception apparatus 12, business firm solution server specification information for specifying the business firm solution server 13 of a URL (Uniform Resource Locator) or the like of the business firm solution server 13 is stored in advance in the memory 62. The reception apparatus 12 reads out the business firm solution server specification information from the memory 62 to access the business firm solution server 13. Further, the business firm solution server specification information is provided, for example, as a setting file. This setting file can be updated suitably based on a digital television broadcasting signal or updating data which is acquired through the Internet 16.

The business firm solution server 13 identifies a business firm which is to serve as a providing source of a digital television program corresponding to channel identification information from the reception apparatus 12 to specify command server specification information of the business firm. In particular, the business firm solution server 13 retains a table which associates, for example, identification information for identifying a digital television program, business firm information of business firms which may serve as a providing source of a digital television program and command server specification information for each business firm with each other. The business firm solution server 13 refers to the table to specify command server specification information of a business firm which provides a digital television program corresponding to channel identification information from the reception apparatus 12. Then, the business firm solution server 13 transmits command server specification information of the specified business firm to the reception apparatus 12 through the Internet 16 (S3). The command server specification information describes, for example, a URL of the command server 14.

The reception apparatus 12 accesses the command server 14 through the Internet 16 in response to command server specification information from the business firm solution server 13. Then, the reception apparatus 12 transmits channel identification information and time position information included in the trigger signal to the command server 14 through the Internet 16 to inquire about a command which can be executed by the reception apparatus 12 (S4).

Here, the time position information is information indicative of a temporal insertion position of trigger information in the digital television program. For example, the time position information indicates a time position or the like at which trigger information is inserted when time after a start to an end of a digital television program is represented on a time axis. This time position information corresponds to "medium time" of FIG. 7 hereinafter described. In FIG. 3, the time position information is indicated by "MT (Media Time)," and "SID" and "MT" are transmitted to the command server 14.

The command server 14 specifies a command corresponding to the channel identification information and the time position information in response to the inquiry from the reception apparatus 12. In particular, the command server 14 manages those commands which can be executed for each digital television program, and specifies a command which can be executed within a time zone corresponding to the time position information in a digital television program corresponding to the channel identification information from the reception apparatus 12. For example, the command server 14 specifies, based on time position information from the reception apparatus 12, one or a plurality of commands which are to be rendered operative within a period, which may be several seconds or several minutes, from time at which object trigger information is received by the reception apparatus 12 to time at which next trigger information is received. Then, the command server 14 transmits the specified command or commands to the reception apparatus 12 through the Internet 16 (S5). It is to be noted that the command or commands are provided, for example, as a command file, represented as "Command File" in FIG. 3. The file thus describes one or a plurality of commands.

It is to be noted that the command server 14 may transmit all of commands for controlling operation of the data broadcasting application to be executed in a linked relationship with the digital television program currently selected by the reception apparatus 12 at once to the reception apparatus 12. In this instance, the reception apparatus 12 executes all of the received commands successively beginning with a command whose command effectuation time comes. It is to be noted that details of the command effectuation time are described later. Further, the command server 14 transmits a command file of the same substance successively by a plural number of times taking electromagnetic interference, a reception miss by the reception apparatus 12 and so forth into consideration.

The reception apparatus 12 receives the command or commands from the command server 14 and analyzes each command. Further, the reception apparatus 12 accesses the application server 15 in accordance with a result of the analysis of the command to request for a data broadcasting application to be executed in a linked relationship with the digital television program being selected (S6), represented by "App request" in FIG. 3.

The application server 15 transmits a data broadcasting application, represented as "Application" in FIG. 3, in accordance with the application request from the reception apparatus 12 (S7). The reception apparatus 12 acquires the data broadcasting application from the application server 15 and starts up the data broadcasting application.

Further, if trigger information is extracted during execution of the data broadcasting application, then the reception apparatus 12 acquires a command for controlling operation of the data broadcasting application being executed from the command server 14 in response to the extracted trigger information. Then, the data broadcasting application executes operation such as event firing, suspension or termination in response to the acquired command.

Since the reception apparatus 12 carries out cooperation with the business firm solution server 13, command server 14 and application server 15 in response to trigger information from the broadcasting apparatus 11 as described above, a data broadcasting application linked with a digital television program being selected is acquired and executed.

It is to be noted that the reception apparatus 12 may access the business firm solution server 13 in advance to collectively acquire the table relating to command server specification information and retain the table into the memory 62 in advance. This makes it possible for the reception apparatus 12 to refer, every time trigger information is received, to the table retained in advance in the reception apparatus 12 itself to specify command server specification information of a business firm which is to serve as a providing source of a digital television program corresponding to channel identification information included in trigger information without accessing the business firm solution server 13. Or, also in the case where command server specification information can be acquired by some other means like a case in which the command server specification information is included in the channel identification information, every time trigger information is received, the reception apparatus 12 can specify the command server specification information without accessing the business firm solution server 13. For example, in the case where the number of channels is restricted to some degree like digital television programs broadcast from the broadcasting apparatus 11, the reception apparatus 12 can specify command server specification information rapidly utilizing the table retained therein.

Further, while it is described in the description given above that, when the reception apparatus 12 inquires the business firm solution server 13 of command server specification information, it transmits only channel identification information, it may otherwise transmit identification information for identifying the reception apparatus 12 side in addition to the channel identification information. As such identification information, for example, terminal identification information for identifying the reception apparatus 12 or user identification information for identifying the user who uses the reception apparatus 12 may be transmitted. This makes it possible for the business firm solution server 13 to carry out, by registering user attribute information corresponding to the identification information such as, for example, the sex, age, address, hobby and so forth of the user in advance, various processes in response to the identification information from the reception apparatus 12 to provide various services for the individual users. For example, the reception apparatus 12 can use the identification information from the reception apparatus 12 to carry out a process relating to a rating research of an individual viewership rate.

Further, while it is described in the foregoing description that, when the reception apparatus 12 inquires the command server 14 of a command, it transmits only channel identification information and time position information, it may transmit identification information for identifying the reception apparatus 12 side such as terminal identification information in addition to the channel identification information and time position information. This makes it possible for the command server 14 to provide, by registering user attribute information corresponding to the identification information such as, for example, the sex of the user, a command customized for each user in response to the identification information from the reception apparatus 12.

Further, while it is described in the foregoing description that, when the reception apparatus 12 inquires the application server 15 of a data broadcasting application, it transmits only an application request, it may otherwise transmit an application request including identification information for identifying the reception apparatus 12 side such as terminal identification information. This makes it possible for the application server 15 to provide, by registering user attribute information corresponding to the identification information such as, for example, the sex of the user, a data broadcasting application customized for each user in response to the identification information from the reception apparatus 12.

It is to be noted that user attribute information corresponding to identification information may be registered in a particular one of the business firm solution server 13, command server 14 and application server 15 such that the particular server carries out a process based on the identification information from the reception apparatus 12 and notifies the other servers of a result of the process. This makes it possible, for example, where only the business firm solution server 13 manages user attribute information corresponding to identification information, for the command server 14 to use a result of the process conveyed from the business firm solution server 13 to provide a command customized for each user to the reception apparatus 12. Further, the application server 15 can use the result of the process conveyed from the business firm solution server 13 to provide a data broadcasting application customized for each user to the reception apparatus 12. In this manner, in the broadcasting system 1, a command or a data broadcasting application in accordance with user identification information is provided to the reception apparatus 12 through cooperation of the servers.

[Communication Method of Trigger Information]

Now, a transmission method of trigger information is described.

Figure 4A:
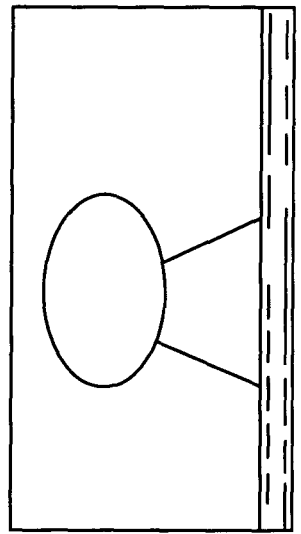
FIGS. 4A and 4B are schematic views illustrating an example of embedding of a trigger signal into a video signal.
Figure 4B:
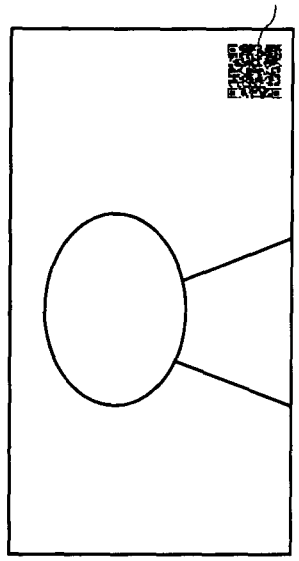

FIGS. 4A and 4B illustrate two different examples in the case where trigger information is embedded in a video signal of a digital television program.

FIG. 4A illustrates an example wherein trigger information is converted into a two-dimensional bar code and superimposed and synthesized at a predetermined position, in FIG. 4A, at a right lower corner position, of an image of a video signal. Meanwhile, FIG. 4B illustrates another example wherein trigger information is converted into an image code and synthesized with several lines at a lower portion of an image of a video signal. The trigger information in FIGS. 4A and 4B is extracted by the trigger extraction section 57 of the reception apparatus 12.

In both of the examples of FIGS. 4A and 4B, trigger information is disposed on an image of a digital television program. Therefore, the trigger information can be conveyed to a reception apparatus which utilizes, for example, a CATV network or a satellite communication network such as, for example, the reception apparatus 12 of FIG. 3.

Further, in both of the examples of FIGS. 4A and 4B, trigger information on an image, that is, a two-dimensional bar code or an image code, is visually observed by the user of the reception apparatus 12. However, if this is not preferable, then an image may be displayed after trigger information on the image is masked by pixels same as pixels therearound.

While FIGS. 4A and 4B illustrate an example wherein trigger information is embedded in a video signal of a digital television program, the placement position and the transmission method of trigger information are not limited to those of this example. For example, trigger information may otherwise be placed in a PCR of a TS.

FIG. 5 illustrates a concept in the case where trigger information is disposed in a PCR packet of a TS of a digital television broadcasting signal.

As seen from FIG. 5, trigger information is not included in all PCR packets but is placed into a PCR packet only at a timing appropriate for linking with a digital television program. Usually, since a PCR packet passes through a PID filter of a CATV re-transmission apparatus, trigger information can be conveyed also to a reception apparatus which utilizes a CATV network or a satellite communication network such as, for example, the reception apparatus 12 of FIG. 3. Or, trigger information may otherwise be placed in a user data region on a video coded stream or an audio coded stream.

It is to be noted that trigger information of the same substance is successively transmitted by a plural number of times taking electromagnetic interference, a reception miss by the reception apparatus 12 and so forth into consideration.

Figure 6:
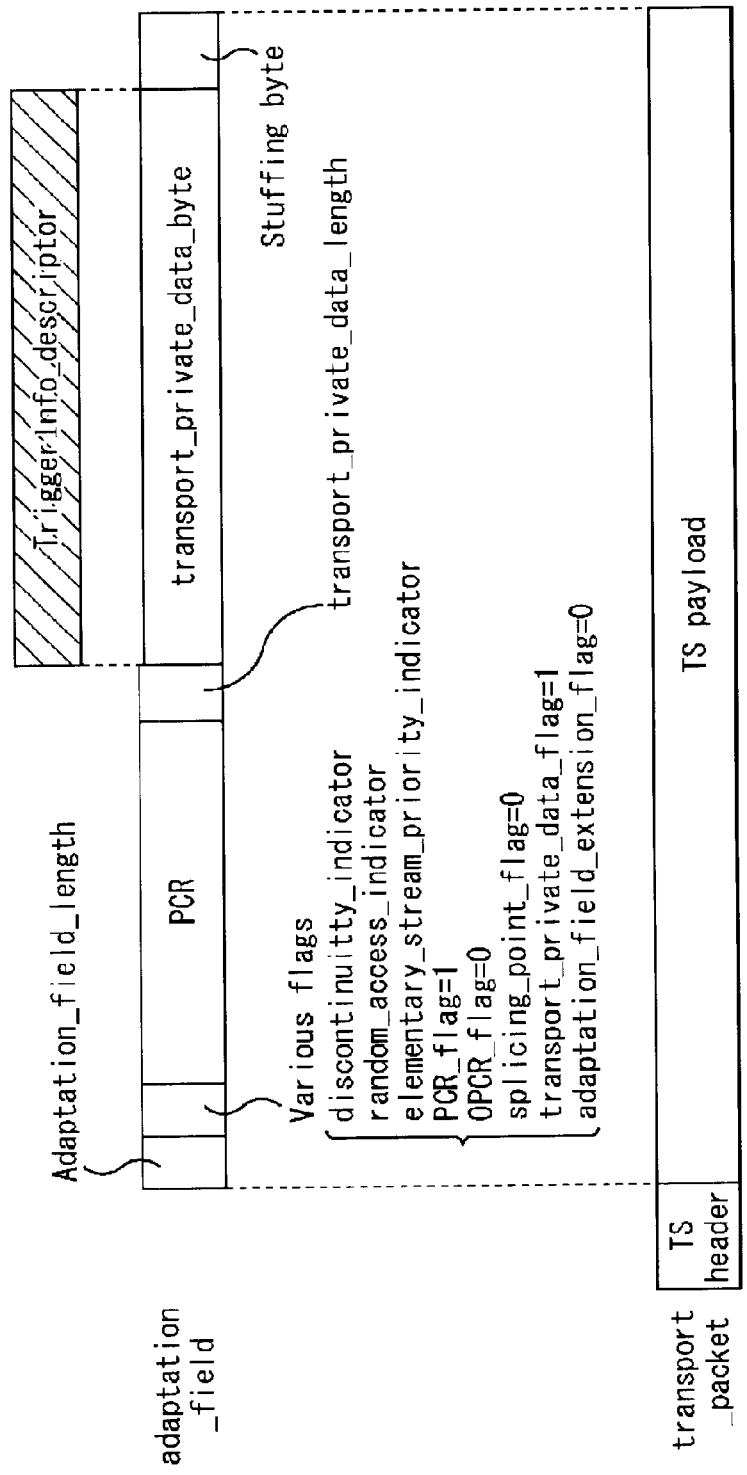
FIG. 6 is a view illustrating particular arrangement of trigger information in a PCR packet.

FIG. 6 illustrates a position of a PCR packet at which trigger information is placed. A PCR packet includes a PCR placed in adaptation_field of a TS packet, and trigger information (Trigger Info_description) is placed in transport_private_data_byte following the PCR. It is to be noted that, in the case where trigger information is placed, transport_private_data_flag of Various_flags provided next to the PCR is set to 1.

[Details of Trigger Information]

Now, details of trigger information are described. FIG. 7 illustrates an example of items of information included in trigger information.

"trigger ID" is information for identifying the trigger information. In the case where trigger information of the same substance is transmitted by a plural number of times, the trigger ID in the trigger information is identical. Accordingly, the reception apparatus 12 may carry out processing only once for trigger information of the same trigger ID.

"source ID type" indicates a type of an AV content transmitted together with the trigger information, and one of "1" and "2" is designated. If "1" is designated as the source ID type, then this represents that the AV content is a "channel," that is, a digital television program or the like transmitted from the broadcasting apparatus 11. On the other hand, if "2" is designated as the source ID type, then this represents that the AV content is a "content," that is, a VOD content distributed by VOD (Video On Demand) from a distribution server, which is a distribution server 91 of FIG. 17 hereinafter described.

"source ID" is information for identifying an AV content as a source. If "1" is designated as the source ID type, then channel identification information for identifying a digital television program is designated as the source ID. Although the channel identification information differs depending upon the broadcasting method, it is formed, for example, from a combination of a network ID, a transport stream ID and a service ID. On the other hand, if "2" is designated as the source ID type, then content identification information for identifying a VOD content is designated as the source ID. For example, a content ID for uniquely specifying a VOD content such as a URL is designated as the content identification information.

"medium time type" is information indicative of a temporal insertion position of the trigger information into an AV content such as a digital television program, and one of "1" to "3" is designated. If "1" is designated as the medium time type, then, for example, as relative time, relative time from start time of the AV content is designated as the medium time. However, if "2" is designated as the medium time type, then particular date and time set in advance is designated as the medium time independently of the progress of the AV content. Further, if "3" is designated as the medium time type, then a STC (System Time Clock) of the TS using a PTS (Presentation Time Stamp) which is time information for carrying out synchronous reproduction is designated as the medium time.

For example, in the case of a VOD content with regard to which the source ID type "2" is designated, the medium time type "1" is designated, and relative time from start time of the VOD content is designated as the medium time. Or, for example, in the case of a digital television program with regard to which the source ID type "1" is designated, the medium time type "2" is designated, and absolute date and time is designated as the medium time. Furthermore, for example, if it is intended to designate more precise time information, then the medium time type "3" is designated and an STC value is designated as the medium time.

It is to be noted that "source ID" corresponds to channel identification information, and "medium time" corresponds to time position information.

The trigger information is configured in such a manner as described above.

[Details of a Command]

FIG. 8 illustrates an example of items of information included in a command.

"command ID" is information for identifying the command. In the case where a command of the same substance is transmitted by a plural number of times, the command IDs of the commands are identical.

"command effectuation time" is designated by "absolute date and time," "relative time" or "PTS" indicative of time at which the command is to be executed. The "relative date and time" are designated in the case where the command is to be executed when particular date and time set in advance comes independently of the progress of the digital television program. Meanwhile, the "relative time" is designated in the case where the command is to be executed when a particular period of time from time which is determined as a reference in the digital television program elapses. For example, as the relative time, a relative period of time from start time of the digital television program is designated. Meanwhile, the "PTS" is designated in the case where the command is to be executed using a PTS which is time information for carrying out synchronous reproduction. In other words, it is possible to adopt a method wherein command effectuation time is designated with a STC value of a TS in addition to a method wherein command effectuation time is designated using hour, minute and second.

It is to be noted that, if the command effectuation time passes already, then the command is executed immediately at a point of time at which it is received.

"command object apparatus type" designates an apparatus which makes an object of data broadcasting application control by the command. Here, not only the reception apparatus main body such as the reception apparatus 12, but also an external apparatus is designated as an object apparatus of the command if the external apparatus is connected to the reception apparatus 12.

"command action" represents which one of "application acquisition" (Register), "application start-up" (Execute), "application end" (Terminate), "event firing" (Inject_event) and "application suspension" (Suspend) the command is.

The register (Register) command is a command for instructing the reception apparatus 12 to acquire or register a data broadcasting application. Here, the registration of a data broadcasting application signifies to store a priority degree and an expiration date in association with the acquired data broadcasting application. The data broadcasting application is managed in accordance with the priority degree and the expiration date by the control section 61.

The execute (Execute) command instructs the reception apparatus 12 to acquire or start up a data broadcasting application.

The terminate (Terminate) command causes the reception apparatus 12 to terminate the data broadcasting application being executed.

The inject event (Inject_event) command causes the reception apparatus 12 to fire an event in a data broadcasting application being executed.

The suspend (Suspend) command causes the reception apparatus 12 to suspend the data broadcasting application being executed.

"command application dispersion parameter" is a parameter for stochastically dispersing the timing at which the command is to be applied by the object apparatus such as the reception apparatus 12. Since the timing at which the command server 14 or the application server 15 is to be accessed is adjusted with this parameter, it is possible to disperse accessing to the server and reduce the load to the server.

"application ID" is identification information of a data broadcasting application corresponding to the command. "application type" is information indicative of a type of a data broadcasting application corresponding to the command. "business firm ID" is identification information of a business firm such as, for example, a broadcasting station which carries out an execution service of the data broadcasting application corresponding to the command.

"application URL" is information of a URL of an acquisition designation of a data broadcasting application in the case where the command action is "application acquisition" or "application start-up." "application expiration date" is information indicative of an expiration date of a data broadcasting application. Further, "application retention priority degree" is information representative of a priority degree when a data broadcasting application corresponding to the command is to be acquired and retained. In the case where a data broadcasting application is registered, the application expiration date and the data broadcasting application retention priority degree are stored, and the data broadcasting application is managed in accordance with the expiration date and the priority degree.

"event ID" is identification information of an event to be fired by a data broadcasting application designated by the application ID in the case where the command action is "event firing." Further, into "even addition data," data to be referred to when an event is to be fired is described in the case where the command action is "event firing."

Detailed specifications of the commands are illustrated in FIGS. 9 and 10.

The command factor principally includes, in addition to a destination attribute and an action attribute, a timing factor, a diffusion factor, an application factor, and an event factor.

The destination attribute corresponds to the "command object apparatus type" of FIG. 8. For example, as the designation attribute, "receiver" is designated in the case where the object apparatus of the command is the reception apparatus 12, but "external_1" or "external_2" is designated in the case where the object apparatus of the command is an external apparatus.

The action attribute corresponds to the "command action" of FIG. 8. For example, as the action attribute, "execute" is designated in the case where acquisition or start-up of a data broadcasting application is designated; "register" is designated in the case where acquisition or registration of a data broadcasting application is designated; "suspend" is designated where suspension of the data broadcasting application is designated; "terminate" is designated where termination of the data broadcasting application is designated; and "event" is designated in the case where an event is to be fired by the data broadcasting application being executed.

The timing factor corresponds to the "command effectuation time" of FIG. 8. As an attribute of the timing factor, a unit attribute is available. For example, as the unit attribute, "utc" is designated where the "absolute date and time" is used; "smpte" is designated in the case where the "relative time" is used; but "pts" is designated in the case where the "PTS" is used.

The diffusion factor corresponds to the "command application dispersion parameter" of FIG. 8. As an attribute of the diffusion factor, a rate attribute, a range attribute and a period attribute are available, and a dispersion number, maximum delay time and a command application diffusion period are designated for them, respectively.

The application factor corresponds to the "application ID," "application type," "application URL," "application retention priority degree" and "application expiration date" of FIG. 8, and an id attribute, a type attribute, a url attribute, a priority attribute and an expire_date attribute are designated. The url attribute and the expire_date attribute are items essentially required in the case where the action attribute is "execute" or "register." Further, as the priority attribute, "0" is designated normally, but "1" is designated if the priority degree is to be set higher.

The event factor corresponds to the "event ID" and the "event addition data" of FIG. 8, and an id attribute and a data attribute are designated. The event factor is an essentially required item in the case where the action attribute is "event."

[Example of Description of a Command]

FIG. 11 illustrates an example of description of a command.

In the example of FIG. 11, two command factors are described, and, for the first command factor, "receiver" is designated as the destination attribute and "execute" is designated as the action attribute. In other words, the command is the execute command to the reception apparatus 12.

The timing factor and the application factor are described between a start tag and an end tag of the command factor. For the timing factor, "pts" is designated as the unit attribute, and "1286743" is designated as the value. In other words, the command is executed when a clock of "1286743" passes.

For the application factor, "1" is designated as the id attribute, "html" as the type attribute, "xxx.com/yyy" as the url attribute; and "2011-01-21" as the expire_date attribute. In other words, the application factor signifies that a data broadcasting application described in the HTML (Hyper Text Markup Language) can be acquired from the application server 15 designated by the URL of "xxx.com/yyy."

For the second command factor, "receiver" is designated as the destination attribute, and "event" is designated as the action attribute. In other words, the command is an inject event command destined for the reception apparatus 12.

The timing factor, application factor and event factor are described between a start tag and an end tag of the command factor. For the timing factor, "pts" is designated as the unit attribute and "1288203" is designated as the value of the same. For the application factor, "1" is designated as the id attribute. Further, for the event factor, "event1" is designated as the id attribute and "zzzzzz . . . z" is designated as the data attribute.

In other words, the command is an inject event command to be executed when a clock of "1288203" passes, and in response to event firing, data of "zzzzzz . . . z" is utilized in the data broadcasting application.

It is to be noted that a command may be described by any description method and the command description method is not limited to that described above with reference to FIG. 11.

[State Transition of the Data Broadcasting Application]

Figure 12:
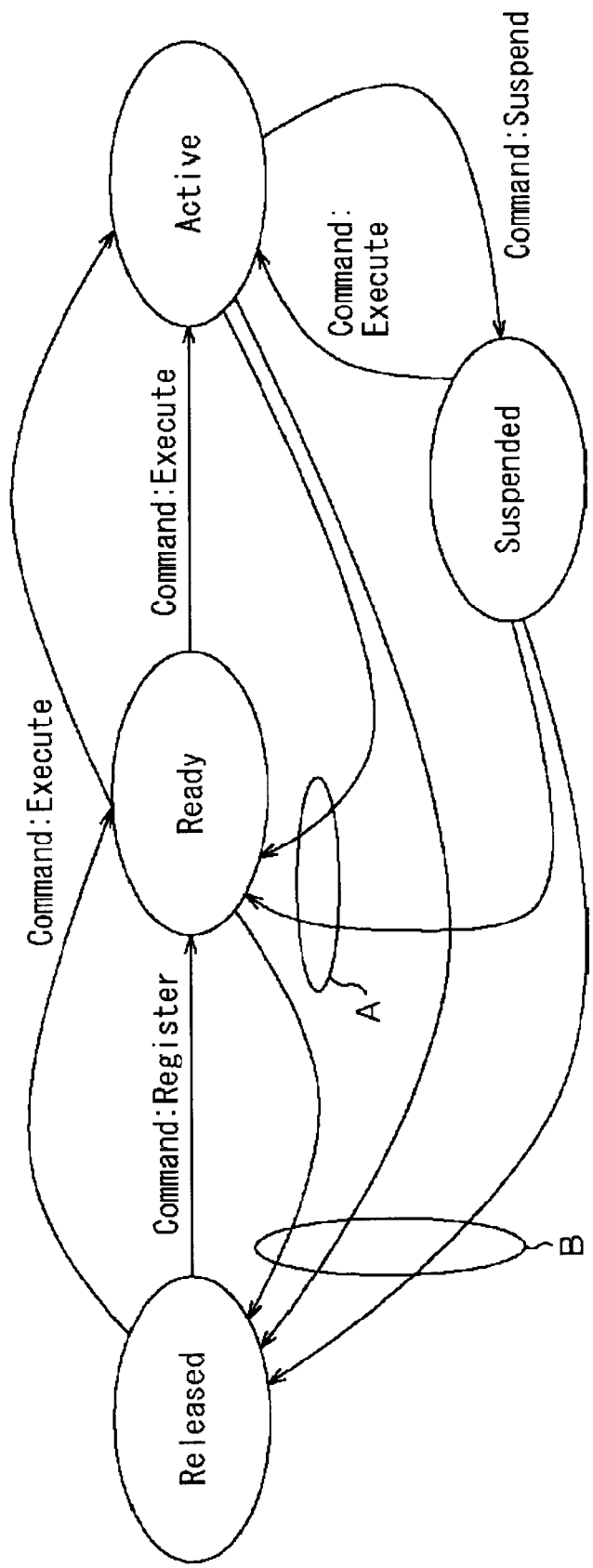
FIG. 12 is a diagrammatic view illustrating state transitions of a data broadcasting application.

FIG. 12 illustrates a state transition of a data broadcasting application which operates in the reception apparatus 12 in response to the register, execute, inject event, suspend and terminate commands. As seen in FIG. 12, the state of the data broadcasting application transits to one of four states including a released state (Released), a ready state (Ready), an active state (Active) and a suspended state (Suspended).

The released state represents a state in which the data broadcasting application is not yet acquired by the reception apparatus 12. The ready state represents a state in which the data broadcasting application is already registered in the reception apparatus 12 but is not yet started up. The active state represents a state in which the data broadcasting application is started up and being executed. The suspended state represents a state in which execution of the data broadcasting application is suspended and information indicative of a state when such suspension occurs is retained in the save memory 66B.

When the data broadcasting application is in the released state, that is, when the data broadcasting application is not yet acquired by the reception apparatus 12, if the register command is received and the data broadcasting application is acquired or registered in accordance with the register command, then the data broadcasting application transits to the ready state.

When the data broadcasting application is in the ready state, if the execute command is received and the data broadcasting application is started up in accordance with the execute command, then the data broadcasting application transits to the active state.

On the other hand, when the data broadcasting application is in the released state and is not yet acquired by the reception apparatus 12, if the execute command is received and the data broadcasting application is acquired and started up in accordance with the execute command, then the data broadcasting application transits to the active state.

When the data broadcasting application is in the active state, if the suspend command is received and the data broadcasting application being executed is suspended in accordance with the suspend command, then the data broadcasting application transits to the suspended state.

When the data broadcasting application is in the suspended state, if the execute command is received and the data broadcasting application whose execution thereof is suspended is resumed in accordance with the execute command, then the data broadcasting application transits to the active state.

When the data broadcasting application is in the active state or the suspended state, if the terminate command is received and the data broadcasting application being executed is terminated in accordance with the terminate command, then the data broadcasting application transits to the ready state as indicated by A in FIG. 12. It is to be noted the transition to the ready state not only occurs based on the terminate command but also occurs when a different data broadcasting application is executed or in some other case.

Further, when the data broadcasting application is in the ready state, active state or suspended state, at the time at which the application expiration date of the command elapses, the data broadcasting application transits to the released state as indicated by B in FIG. 12.

Figure 13:
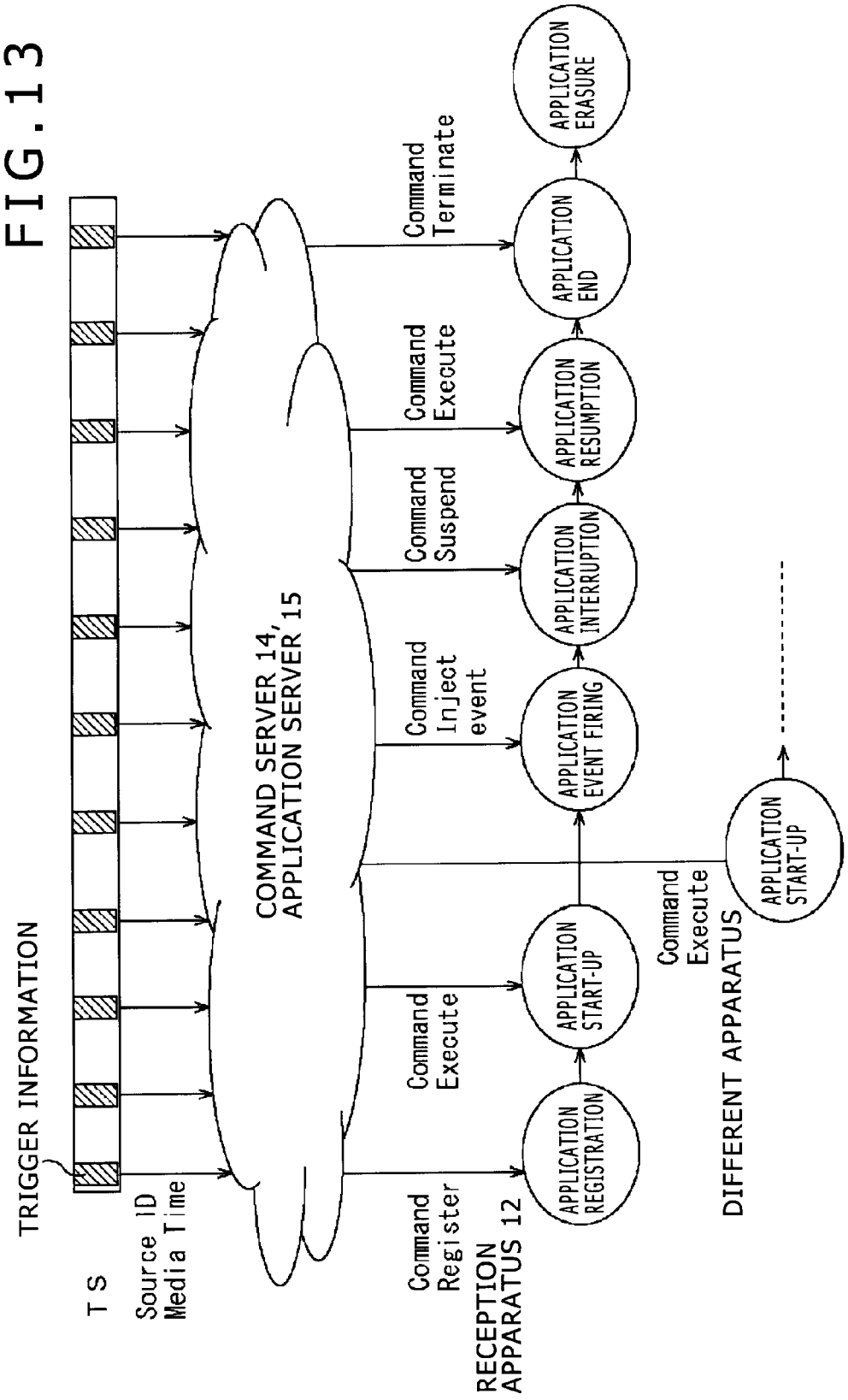
FIG. 13 is a diagrammatic view illustrating a relationship between commands and state transitions.

FIG. 13 illustrates a relationship between the commands and the state transitions.

More particularly, FIG. 13 illustrates a manner in which, when the reception apparatus 12 transmits channel identification information denoted by "Source ID" in FIG. 13 and time position information denoted by "Media Time" in FIG. 13 both included in trigger information transmitted together with a digital television broadcasting signal of a digital television program to the command server 14, various commands are acquired from the command server 14 and a data broadcasting application is acquired from the application server 15.

When the data broadcasting application is in the released state and is not yet acquired by the reception apparatus 12, if the data broadcasting application is acquired by and retained and registered into the reception apparatus 12 in accordance with the register command, then the data broadcasting application transits to the ready state.

When the data broadcasting application is in the ready state in the reception apparatus 12, if the data broadcasting application is started up in response to the execute command, then the data broadcasting application transits to the active state.

On the other hand, when the data broadcasting application in a different apparatus than the reception apparatus 12 is in the released state and is not yet acquired by the different apparatus, if the data broadcasting application is acquired and started up in accordance with the execute command, then the data broadcasting application transits to the active state.

When the data broadcasting application in the reception apparatus 12 is in the active state, if an event is fired in the data broadcasting application being executed in accordance with the inject event command, then the data broadcasting application remains in the active state.

When the data broadcasting application in the reception apparatus 12 is in the active state, if the data broadcasting application being executed is suspended in response to the suspend command, then the data broadcasting application transits to the suspended state. When the data broadcasting application in the reception apparatus 12 is in the suspended state, if the data broadcasting application in the suspended state is resumed in response to the execute command, then the data broadcasting application transits to the active state.

On the other hand, when the data broadcasting application in the reception apparatus 12 is in the active state, if the data broadcasting application being executed is terminated in response to the terminate command, then the data broadcasting application transits to the ready state. It is to be noted that, when the data broadcasting application is in the ready state, active state or suspended state, if the application expiration date of the data broadcasting application comes, then the data broadcasting application is erased from the cache memory 65 and the registration is deleted. Thus, the data broadcasting application transits to the released state.

[Command Dealing Process]

Now, a command dealing process when the reception apparatus 12 receives a command is described with reference to FIG. 14.

Figure 14:
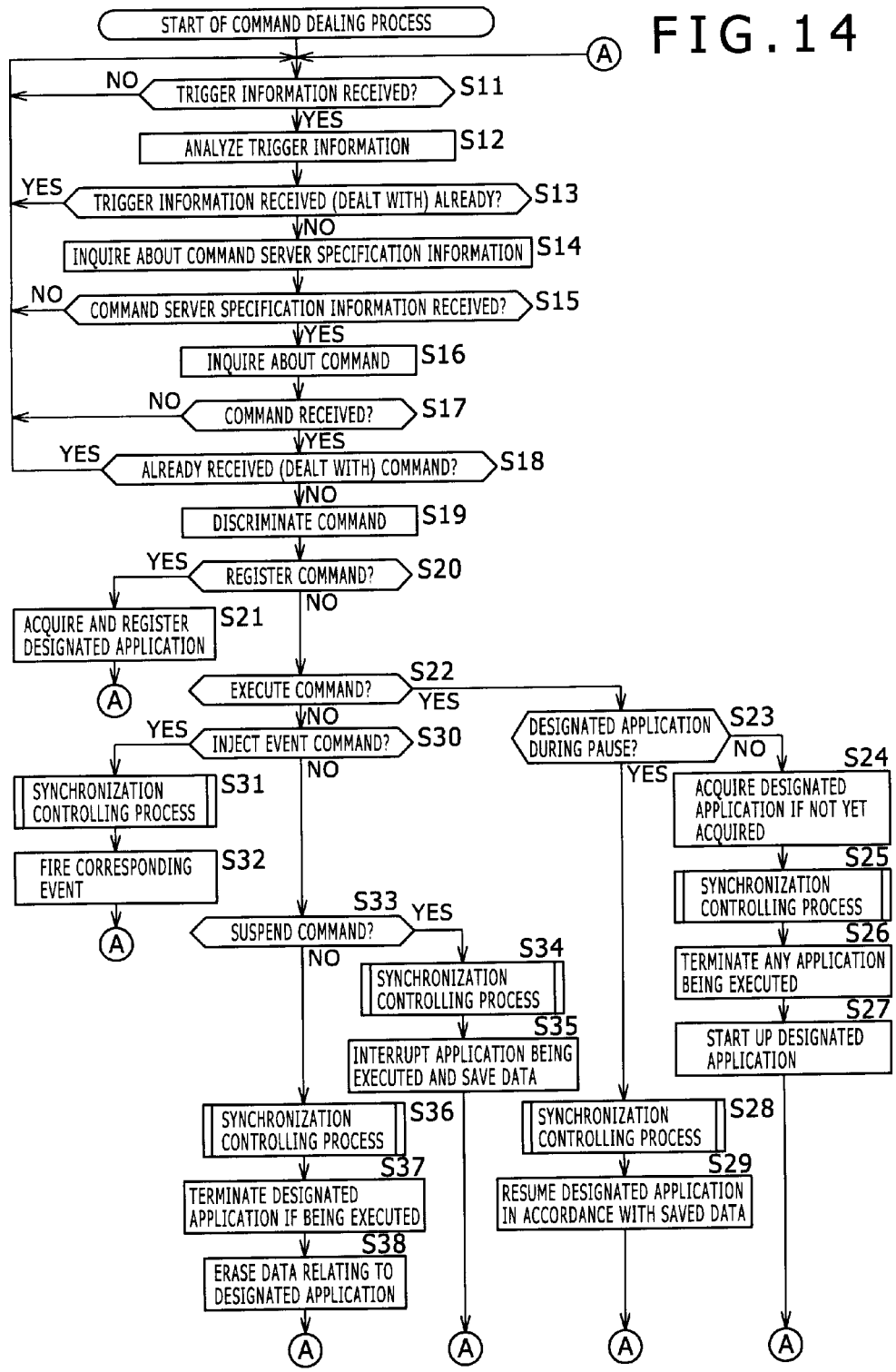
FIG. 14 is a flow chart illustrating a command dealing process.

FIG. 14 is a flow chart illustrating the command dealing process. The command dealing process is executed repetitively when the user is viewing a digital television program, that is, while the reception apparatus 12 receives a digital television broadcasting signal.

At step S11, the trigger extraction section 57 waits until it extracts trigger information from a video signal from the video decoder 55. Then, when trigger information is extracted from the video signal, the processing advances to step S12. At step S12, the trigger extraction section 57 carries out an analysis of the extracted trigger information.

At step S13, the trigger extraction section 57 decides based on a result of the analysis of the trigger information whether or not processes at steps beginning with step S14 have been executed already for a trigger ID included in the trigger information. If it is decided that the processes at steps beginning with step S14 have been executed already, then the processing returns to step S11, and the processes at the steps beginning with step S11 are repeated. On the other hand, if it is decided that the processes at steps beginning with step S14 have not been executed as yet for the trigger information, then the processing advances to step S14.

At step S14, the trigger extraction section 57 controls the communication I/F 58 to transmit channel identification information included in the trigger information to the business firm solution server 13 through the Internet 16 to inquire about command server specification information.

The business firm solution server 13 specifies a business firm of a providing source of the digital television program based on the channel identification information from the reception apparatus 12 and transmits command server specification information of the specified business firm to the reception apparatus 12. It is to be noted that, if the business firm solution server 13 fails to acquire command server specification information, then transmission of command server specification information is not carried out. Or command server specification information representing that no pertaining information is available may be transmitted.

At step S15, the control section 61 controls the communication I/F 58 to decide whether or not command sever specification information is received from the business firm solution server 13.

If it is decided at step S15 that the command server specification information is not received, then the processing returns to step S11 to repeat the processes at steps beginning with step S11.

On the other hand, if it is decided at step S15 that command server specification information is received, then the received command server specification information is acquired by the control section 61. Then, the processing advances to step S16. At step S16, the control section 61 controls the communication I/F 58 to access the command server 14 corresponding to a URL indicated by the command server specification information and a command which is enabled to be executed by the reception apparatus 12 by transmitting channel identification information and time position information. The command server 14 acquires a command which is enabled to be executed within a time zone corresponding to the time position information in a digital television program corresponding to the channel identification information, and transmits the command to the reception apparatus 12.

At step S17, the control section 61 controls the communication I/F 58 to decide whether or not a command is received from the command server 14 of the inquiry destination about a command.

If it is decided at step S17 that a command is not received, then the processing returns to step S11 so that the processes at steps beginning with step S11 are repeated. For example, if the command server 14 does not have a command which satisfies conditions provided by the channel identification information and the time position information, it does not carry out transmission of a command. Or, a command representing that no processing is required may be transmitted.

On the other hand, if it is decided at step S17 that a command is received, then the processing advances to step S18. At step S18, the command analysis section 60 reads out a command ID included in the command and decides whether or not processes at steps beginning with step S19 have been executed already for the command. If it is decided that the processes at steps beginning with step S19 have been executed already, then the processing returns to step S11 so that the processes at steps beginning with step S11 are repeated. On the other hand, if it is decided that the processes at steps beginning with step S19 have not been executed for the command, then the processing advances to step S19.

At step S19, the command analysis section 60 reads out a command action included in the command and decides which one of the register, execute, terminate, inject event and suspend commands the command is.

At step S20, the command analysis section 60 decides whether or not a result of the decision at step S19 is the register command. If it is decided that the result of the decision is the register command, then the processing advances to step S21.

At step S21, the control section 61 controls the communication I/F 58 to access the application server 15 corresponding to an application URL of the command to acquire a data broadcasting application specified by the application ID. The data broadcasting application acquired by the communication I/F 58 is retained into the cache memory 65. Further, the control section 61 stores an application expiration date and an application retention priority degree of the acquired data broadcasting application in association with the data broadcasting application in the memory 62. Consequently, the data broadcasting application retained in the cache memory 65 is managed in accordance with the expiration date and the retention priority degree by the control section 61.

Thereafter, the processing returns to step S11 so that processes at steps beginning with step S11 are repeated.

If it is decided at step S20 that the decision result at step S19 is not the register command, then the processing advances to step S22. At step S22, the control section 61 decides whether or not the decision result at step S19 is the execute command. If it is decided that the decision result is the execute command, then the processing advances to step S23.

At step S23, the application engine 64 decides under the control of the control section 61 whether or not the data broadcasting application specified by the command ID of the command is in an inactive or suspended state. In particular, the application engine 64 decides that the data broadcasting application is in the suspended state if data representative of the suspended state of the data broadcasting application specified with the command ID is saved in the save memory 66B.

If it is decided at step S23 that the data broadcasting application specified with the command ID is not in the suspended state, then the processing advances to step S24. At step S24, the application engine 64 acquires, under the control of the control section 61, the data broadcasting application specified with the command ID if the data broadcasting application is not acquired as yet, that is, does not exist in the cache memory 65.

At step S25, the control section 61 carries out a synchronization controlling process. Here, details of the synchronization controlling process are described with reference to a flow chart of FIG. 15.

At step S51, the control section 61 decides whether or not command effectuation time included in the command is set.

If it is decided at step S51 that the command effectuation time is set, then the processing advances to step S52. At step S52, the control section 61 decides whether or not time at which the command is to be executed comes.

This command effectuation time is designated, for example, by "absolute date and time," "relative time" or "PTS." In the decision process at step S52, if "absolute date and time" is designated, then it is decided whether or not the particular date and time set in advance comes. On the other hand, if "relative time" is designated, then it is decided whether or not, for example, a particular period of time set in advance from start time of a digital television program elapses. Further, if "PTS" is designated, then it is decided based on the clock from the clock synchronization section 59 whether or not time at which the command is to be executed comes.

The decision process at step S52 is repeated until after it is decided that the time at which the command is to be executed comes. In other words, execution of the command is waited until the time at which the command is to be executed comes.

Then, at step S52, when it is decided that the time at which the command is to be executed comes, the processing returns to step S25 of FIG. 14 so that the processes at steps beginning with step S25 are executed.

At step S26, the application engine 64 stops execution of the data broadcasting application under the control of the control section 61 if the data broadcasting application is being executed at present. Then at step S27, the application engine 64 starts up the data broadcasting application specified with the command ID under the control of the control section 61.

Figure 15:
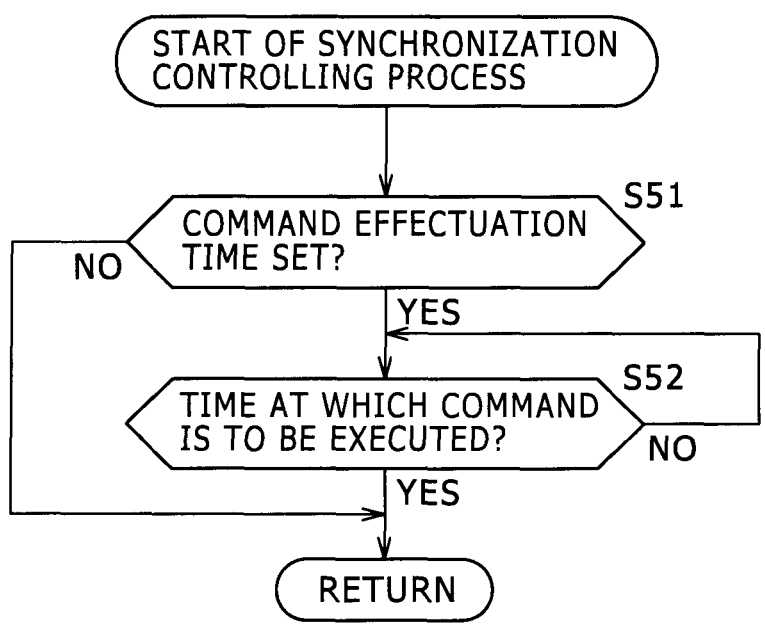
FIG. 15 is a flow chart illustrating a synchronization controlling process.

In particular, by carrying out the synchronization control of FIG. 15 at step S25, the data broadcasting application is started up after time at which the command is to be carried out comes. This makes it possible, for example, to start up the data broadcasting application in accordance with the progress of the digital television program or to start up the data broadcasting application within a particular time zone.

Further, in the case where command effectuation time is not set, that is, in the case where the decision at step S51 of FIG. 15 is "No," the step S52 of FIG. 15 is skipped, and immediately after the acquisition process at step S24 ends, the processes at steps S26 and S27 are executed. In this instance, immediately after a data broadcasting application which is not acquired as yet is acquired, the data broadcasting application is started up.

Thereafter, the processing returns to step S11 so that processes at steps beginning with step S11 are repeated.

On the other hand, if it is decided at step S23 that the data broadcasting application specified with the command ID is in the suspended state, then the processing advances to step S28.

At step S28, the control section 61 carries out the synchronization controlling process of FIG. 15. In particular, if command effectuation time is set, then when time at which the command is to be executed comes, the process at step S29 is carried out, but in the case where command effectuation time is not set, the process at step S29 is carried out immediately.

At step S29, the application engine 64 transfers data in the save memory 66B to the work memory 66A and starts up the data broadcasting application specified with the command ID under the control of the control section 61. Consequently, the data broadcasting application in an inoperative state specified with the command ID is resumed from the state at the time of the suspension. Thereafter, the processing returns to step S11 so that the processes at steps beginning with step S11 are repeated.

If it is decided at step S22 that the decision result at step S19 is not the execute command, then the processing advances to step S30. At step S30, the control section 61 decides whether or not the decision result at step S19 is the inject event command. If it is decided that the decision result is the inject event command, then the processing advances to step S31.

At step S31, the control section 61 carries out the synchronization controlling process of FIG. 15. In particular, in the case where command effectuation time is set, when the time at which the command is to be executed comes, the process at step S32 is carried out, but if command effectuation time is not set, then the process at step S32 is carried out immediately.

At step S33, the control section 61 controls, only when the command ID of the command and the command ID of the data broadcasting application operating currently coincide with each other, the application engine 64 to cause the data broadcasting application operating currently to fire or execute an event corresponding to the event ID of the command. Thereafter, the processing returns to step S11 so that the processes at the steps beginning with step S11 are repeated.

If it is decided at step S30 that the decision result at step S19 is not the inject event command, then the processing advances to step S33. At step S33, the control section 61 decides whether or not the decision result at step S19 is the suspend command. If it is decided that the decision result is the suspend command, then the processing advances to step S34.

At step S34, the control section 61 carries out the synchronization controlling process of FIG. 15. In particular, if command effectuation time is set, then when the time at which the command is to be executed comes, the process at step S35 is carried out. However, if no command effectuation time is set, then the process at step S35 is carried out immediately.

At step S35, the application engine 64 saves data indicative of a state of the data broadcasting application being currently executed into the save memory 66B under the control of the control section 61. The data in this instance is data written in the work memory 66A at present and includes information indicative of a hierarchy of the information displayed if the information displayed has a hierarchical structure. Thereafter, the processing returns to step S11 so that the processes at the steps beginning with step S11 are repeated.

If it is decided at step S33 that the decision result at step S19 is not the suspend command, then since the decision result at step S19 is the terminate command, the processing advances to step S36.

At step S36, the control section 61 carries out the synchronization controlling process of FIG. 15. In particular, if command effectuation time is set, then when the time at which the command is to be executed comes, the process at step S37 is carried out. However, if no command effectuation time is set, then the process at step S37 is carried out immediately.

At step S37, the application engine 64 ends the data broadcasting application specified with the command ID under the control of the control section 61 if the data broadcasting application is being executed. At step S38, the application engine 64 erases data relating to the data broadcasting application specified with the command ID from the work memory 66A and the save memory 66B and erases the data broadcasting application from the cache memory 65 under the control of the control section 61. Thereafter, the processing returns to step S11 so that the processes at the steps beginning with step S11 are repeated.

The command dealing process is such as described above. According to the command dealing process described above, it is possible to start up a data broadcasting application, fire an event or terminate an event in a linked relationship with an AV content of a television broadcast such as, for example, a digital television program or a CM. Further, it is possible to suspend a data broadcasting application while the state of the data broadcasting application during execution is retained, execute a different data broadcasting application, terminate the execution of the different data broadcasting application and then resume the data broadcasting application from the suspended state.

It is to be noted that it is described above in regard to the example of FIG. 14 that, as processes at steps S24 to S27, after a data broadcasting application which is not yet acquired is acquired at step S24, when time at which the command is to be executed comes at step S25, the acquired data broadcasting application is started up. However, the order of the processes at steps S24 and S25 may be reversed. In particular, in this instance, before time at which the command is to be executed comes, acquisition of the data broadcasting application which is not yet acquired is not carried out, and then when the time at which the command is to be executed comes, the data broadcasting application which is not yet acquired is acquired and started up.

[Operation Scenario]

Figure 16:
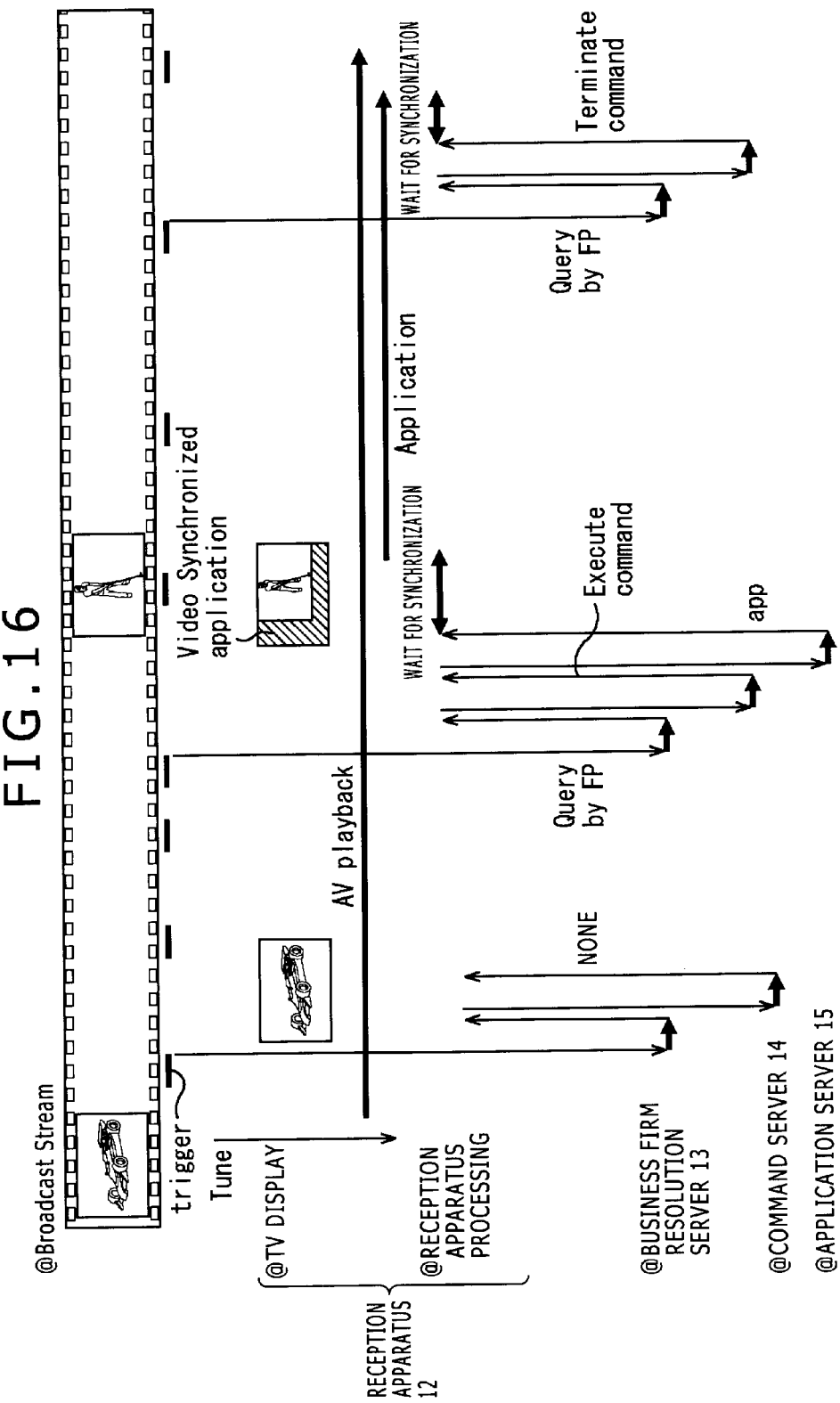
FIG. 16 is a diagrammatic view illustrating an example of an operation scenario.

If the reception apparatus 12 carries out the command dealing process described above, then such practical use of a data broadcasting application as illustrated in FIG. 16 can be achieved.

FIG. 16 illustrates an example of an operation scenario in the case where command effectuation time is set.

Referring to FIG. 16, if trigger information is inputted to the reception apparatus 12 when the reception apparatus 12 displays a digital television program corresponding to a digital television broadcasting signal from the broadcasting apparatus 11 on the monitor, then the reception apparatus 12 inquires the business firm solution server 13 of command server specification information.

Although the reception apparatus 12 inquires the command server 14 of a command in response to the command server specification information from the business firm solution server 13, if a command whose execution by the reception apparatus 12 is enabled does not exist, then no response is carried out from the command server 14.

Thereafter, the reception apparatus 12 carries out extraction of trigger information, and carries out also inquiry to the business firm solution server 13 and the command server 14 continuously in a corresponding relationship to the extraction of trigger information. Then, if the execute command is received from the command server 14, then the reception apparatus 12 accesses the application server 15 corresponding to the application URL (FIG. 8) to acquire a data broadcasting application. Further, since command effectuation time is set in the execute command, the reception apparatus 12 waits, after it acquires the data broadcasting application, execution of the execute command until time at which the command is to be executed comes ("wait for synchronization" in FIG. 16). For example, in the case where program related information corresponding to a data broadcasting application is to be displayed in synchronism with a particular scene of a digital television program, since the timing for the synchronization with the particular scene is described in the command effectuation time, the reception apparatus 12 starts up the data broadcasting application after waiting that the timing at which the command is to be executed comes. Consequently, it is possible to synchronize a particular scene of a digital television program and program related information, which is the "Video Synchronized application" in FIG. 16, with each other.

Also thereafter, extraction of trigger information is carried out continuously. Then, if the terminate command is received from the command server 14, then the reception apparatus 12 terminates the data broadcasting application being executed after waiting the time at which the command is to be executed. Consequently, on the monitor, program related information displayed in a superimposed relationship with a digital television program is erased, and only the program is displayed.

While, in the foregoing description of the example of FIG. 16, the execute command and the terminate command are described as commands received from the command server 14, any other command may be received. For example, if the inject event command is received during execution of a data broadcasting application, then an event is fired in the data broadcasting application being executed after time at which the command is to be executed is waited. On the other hand, if the suspend command is received during execution of a data broadcasting application, then the data broadcasting application being executed is suspended after time at which the command is to be executed is waited.

As described above, in the operation scenario of FIG. 16, since command effectuation time is set in a command transmitted from the command server 14, the reception apparatus 12 executes the command inputted from the command server 14 after it waits the timing at which the command is to be executed. Consequently, the reception apparatus 12 can execute the command at an arbitrary timing without depending upon the resolution in extraction of trigger information.

Second Embodiment

[Example of the Configuration of the Communication System]

In the foregoing description, the example wherein a digital television broadcasting signal of an AV content such as a digital television program transmitted from the broadcasting apparatus 11 is received by the reception apparatus 12 is described. However, an AV content may otherwise be distributed by VOD through the Internet 16.

Figure 17:
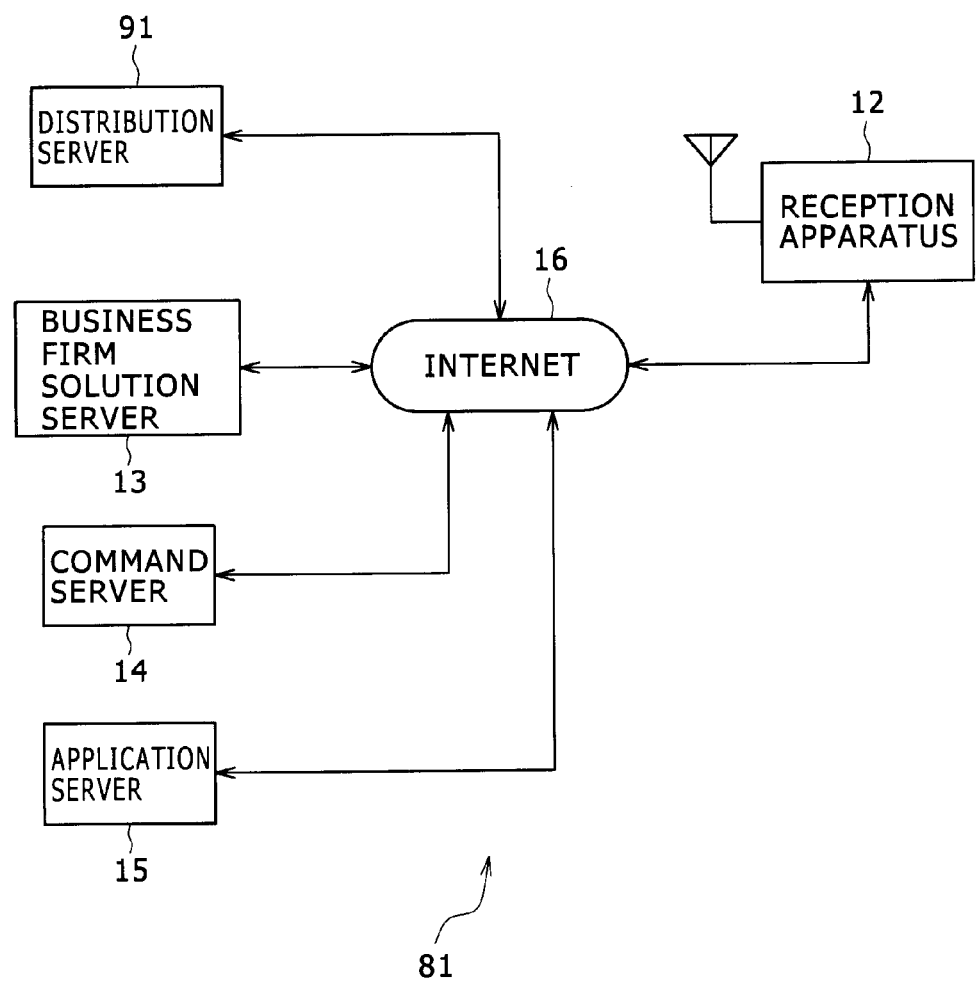
FIG. 17 is a block diagram showing an example of a configuration of a communication system.

FIG. 17 shows a communication system 81 according to the present embodiment.

The communication system 81 shown in FIG. 17 includes several common or similar components to those of the broadcasting system 1 described hereinabove with reference to FIG. 1, and overlapping description of such common components is omitted herein to avoid redundancy.

In particular, if the communication system 81 shown in FIG. 17 is compared with the broadcasting system 1 shown in FIG. 1, then the communication system 81 includes a distribution server 91 connected to the Internet 16 in place of the broadcasting apparatus 11. The distribution server 91 distributes an AV content such as a VOD content to the reception apparatus 12 through the Internet 16 in response to a request from the reception apparatus 12. Further, the distribution server 91 transmits trigger information together with the VOD content.

The reception apparatus 12 extracts trigger information transmitted together with a VOD content from the distribution server 91 and transmits content identification information included in the extracted trigger information to the business firm solution server 13. In particular, as indicated also in "source ID" in FIG. 7, if the reception apparatus 12 receives a digital television broadcasting signal of a digital television program or the like from the broadcasting apparatus 11, then channel identification information is acquired from the trigger information. However, if a VOD content is received from the distribution server 91, then content identification information such as a content ID is acquired.

The reception apparatus 12 accesses the command server 14 corresponding to a URL described in the command server specification information and transmits content identification information and time position information to inquire about a command which can be executed by the reception apparatus 12. Then, the reception apparatus 12 controls a data broadcasting application, which is executed in a linked relationship with a VOD content, in response to the command from the command server 14.

In this manner, the reception apparatus 12 can receive an AV content not only through a broadcasting network but also through a communication network. Then, from whichever one of a broadcasting network and a communication network an AV content is received, it can be identified from channel identification information or content identification information included in the trigger information. Therefore, the reception apparatus 12 can acquire a command corresponding to the channel identification information or the content identification information from the command server 14.

It is to be noted that, while the foregoing description is directed to the example wherein a plurality of servers are provided for individual functions to be provided like the business firm solution server 13, command server 14 and application server 15, all or some of such functions may be provided collectively from one or a plurality of servers. Further, the command server 14 may transmit an acquisition command for a data broadcasting application not to the reception apparatus 12 but directly to the application server 15. This makes it possible to achieve such practical use that the reception apparatus 12 transmits channel identification information or content identification information and time position information to the command server 14 and acquires a data broadcasting application from the application server 15.

As described above, according to the present technology, an application program which is executed in a linked relationship with an AV content such as a digital television program or a VOD content can be provided. Further, in the reception apparatus 12, cooperation with a suitable server is carried out in response to trigger information, and operation of a data broadcasting application which is executed in a linked relationship with an AV content such as a digital television program of a selected channel is controlled. Therefore, an application program can be provided which is executed in a linked relationship with a digital television program without involving an operation to modify equipments of a CATV network or a satellite network or a terminal for exclusive use or to obtain a license of a broadcasting business firm which carries out repeating.

[Computer to which the Present Technology is Applied]

While the series of processes described above can be executed by hardware, it may otherwise be executed by software. In the case where the series of processes is executed by software, a program which constructs the software is installed into a computer. The computer here may be a computer incorporated in hardware for exclusive use, a personal computer, for example, for universal use which can execute various functions by installing various programs, or the like.

FIG. 18 is a block diagram showing an example of a hardware configuration of a computer which executes the series of processes described hereinabove in accordance with a program.

In the computer 100, a CPU (Central Processing Unit) 101, a ROM (Read Only Memory) 102 and a RAM (Random Access Memory) 103 are connected to one another by a bus 104.

Further, an input/output interface 105 is connected to the bus 104. An inputting section 106, an outputting section 107, a recording section 108, a communication section 109, and a drive 110 are connected to the input/output interface 105.

The inputting section 106 includes a keyboard, a mouse, a microphone and so forth. The outputting section 107 includes a monitor, a speaker and so forth. The recording section 108 is formed from a hard disk, a nonvolatile memory, or the like. The communication section 109 is formed from a network interface and so forth. The drive 110 drives a removable medium 111 such as a magnetic disk, an optical disk, a magneto-optical disk or a semiconductor memory.

In the computer 100 configured in such a manner as described above, the CPU 101 loads a program stored, for example, in the recording section 108 into the RAM 103 through the input/output interface 105 and the bus 104 and executes the program to carry out the series of processes described above.

The program to be executed by the computer 100 or CPU 101 can be recorded on and provided as, for example, a removable medium 111 as a packet medium or the like. Or, the program can be provided through a wire or wireless transmission medium such as a local area network, the Internet or a digital satellite broadcast.

In the computer 100, the program can be installed into the recording section 108 through the input/output interface 105 by loading the removable medium 111 into the drive 110. Further, the program can be received by the communication section 109 through a wire or wireless transmission medium and installed into the recording section 108. Or, the program may be installed in advance in the ROM 102 or the recording section 108.

It is to be noted that the program to be executed by the computer 100 may be of the type by which the processes are carried out in a time series in the order as described in the present specification or of the type by which the processes are executed at necessary timings such as when they are called.

Further, the processing steps which describe the program for causing the computer 100 to carry out various processes need not necessarily be processed in a time series in the order as described in the flow chart but include those processes which may be executed in parallel or individually such as, for example, parallel processes or processes which depend upon an object.

Further, the program may be processed by a single computer or may be processed discretely by a plurality of computers. Further, the program may be transferred to and executed by a computer at a remote place.

Further, in the present specification, the term "system" is used to represent a set of a plurality of components such as devices and modules or parts, and it does not matter whether or not all components are included in the same housing. Accordingly, a plurality of devices or apparatus which are accommodated in separate housings and connected to each other through a network and one apparatus which includes a plurality of modules accommodated in one housing are individually regarded as a system.

While preferred embodiments of the disclosed technology have been described using specific terms, such description is for illustrative purpose only, and it is to be understood that changes and variations may be made without departing from the spirit or scope of the claims given below.

Further, the present technology may have the following configuration.

[1]
A reception apparatus, including:
a reception section adapted to receive an AV content;
a trigger extraction section adapted to extract trigger information transmitted together with the AV content for rendering an application program, which is to be executed in a linked relationship with the AV content, operative;
a command acquisition section adapted to acquire a command for controlling the operation of the application program in response to the extracted trigger information; and
a control section adapted to control the operation of the application program in response to the acquired command.

[2]
The reception apparatus according to [1], wherein the command indicates one of acquisition or registration, acquisition or start-up, event firing, suspension and termination of the application program, and
the control section controls, in response to the command, acquisition or registration, or acquisition or start-up, of the application program, or event firing, suspension or termination of the application program being executed.

[3]
The reception apparatus according to [1] or [2], wherein the command includes time information indicative of time at which the command is to be executed, and
the control section executes the command in response to the time information.

[4]
The reception apparatus according to [3], wherein the time information is information for allowing the command to be executed when particular time determined in advance comes independently of the progress of the AV content or information for allowing the command to be executed when particular time determined in advance in a linked relationship with the progress of the AV content passes.

[5]
The reception apparatus according to [3] or [4], wherein, when the command indicates acquisition or start-up and the application program is not acquired as yet, the control section starts up, after the control section acquires the application program, the acquired application program when the time at which the command is to be executed comes.

[6]
The reception apparatus according to any of [1] to [5], wherein the trigger information includes identification information for identifying the AV content and time position information regarding a temporal insertion position of the trigger information in the AV content, and
the command acquisition section acquires the command specified by the identification information and the time position information.

[7]
The reception apparatus according to according to any of [1] to [6], further including
a transmission section adapted to transmit identification information for identifying the reception apparatus side to an information processing apparatus which provides the command,
the command acquisition section acquiring the command in response to the identification information from the information processing apparatus.

[8]
The reception apparatus according to [2], further including
a transmission section adapted to transmit identification information for identifying the reception apparatus side to an information processing apparatus which provides the application program,
the control section controlling the acquisition of the application program in response to the identification information from the information processing apparatus.

[9]
The reception apparatus according to any of [1] to [8], further including
a specification information acquisition section adapted to acquire specification information for specifying an information processing apparatus, which provides the command, in response to the extracted trigger information;

the command acquisition section accessing the information processing apparatus, which is specified by the acquired specification information, to acquire the command.

[10]
A reception method for a reception apparatus, including:
receiving an AV content;
extracting trigger information transmitted together with the AV content for rendering an application program, which is to be executed in a linked relationship with the AV content, operative;
acquiring a command for controlling operation of the application program in response to the extracted trigger information; and
controlling the operation of the application program in response to the acquired command.

[11]
A program for causing a computer to function as:
a reception section adapted to receive an AV content;
a trigger extraction section adapted to extract trigger information transmitted together with the AV content for rendering an application program, which is to be executed in a linked relationship with the AV content, operative;
a command acquisition section adapted to acquire a command for controlling the operation of the application program in response to the extracted trigger information; and
a control section adapted to control the operation of the application program in response to the acquired command.

[12]
An information processing system, including:
a reception apparatus adapted to receive an AV content;
a first information processing apparatus adapted to specify an acquisition destination of a command for controlling operation of an application program to be executed in a linked relationship with the AV content;
a second information processing apparatus adapted to provide the command; and
a third information processing apparatus adapted to provide the application program;
the reception apparatus including
a reception section adapted to receive the AV content,
a trigger extraction section adapted to extract trigger information transmitted together with the AV content for rendering the application program operative,
a specification information acquisition section adapted to acquire specification information for specifying the second information processing apparatus from the first information processing apparatus in response to the extracted trigger information,
a command acquisition section adapted to access the second information processing apparatus specified by the specification information acquired from the first information processing apparatus to acquire the command, and
a control section adapted to control the operation of the application program acquired from the third information processing apparatus in response to the command acquired from the second information processing apparatus,
the first information processing apparatus including a first provision section adapted to provide the specification information in response to an inquiry from the reception apparatus,
the second information processing apparatus including a second provision section adapted to provide the command in response to an inquiry from the reception apparatus,
the third information processing apparatus including a third provision section adapted to provide the application program in accordance with the command in response to an inquiry from the reception apparatus.

What is claimed is:

1. A reception apparatus, comprising:
circuitry to
receive an AV content;
extract trigger information transmitted together with the AV content for rendering a downloaded application, which is to be executed in a linked relationship with the AV content;
automatically acquire a command, which is different from the trigger information, for controlling operation of the downloaded application, the command being automatically acquired in response to processing the extracted trigger information, without user intervention, and from an external network source; and
control the operation of the downloaded application in response to the acquired command.

2. The reception apparatus according to claim 1, wherein the command indicates one of acquisition or registration, acquisition or start-up, event firing, suspension and termination of the application, and
said circuitry is further configured to control, in response to the command, acquisition or registration, or acquisition or start-up, of the application, or event firing, suspension or termination of the application being executed.

3. The reception apparatus according to claim 2, wherein the command includes time information indicative of time at which the command is to be executed, and
said circuitry is further configured to execute the command in response to the time information.

4. The reception apparatus according to claim 3, wherein the time information is information for allowing the command to be executed when a particular time determined in advance comes independently of the progress of the AV content or information for allowing the command to be executed when a particular time determined in advance in a linked relationship with the progress of the AV content passes.

5. The reception apparatus according to claim 3, wherein, when the command indicates acquisition or start-up and the application is not acquired as yet, said circuitry is further configured to start up, after said circuitry acquires the application, the acquired application when the time at which the command is to be executed comes.

6. The reception apparatus according to claim 2, wherein the circuitry is further to
transmit identification information for identifying said reception apparatus side to an information processing apparatus which provides the application, and
control the acquisition of the application in response to the identification information from the information processing apparatus.

7. The reception apparatus according to claim 1, wherein the trigger information includes identification information for identifying the AV content and time position information regarding a temporal insertion position of the trigger information in the AV content, and
said circuitry is further configured to acquire the command specified by the identification information and the time position information.

8. The reception apparatus according to claim 1, wherein said circuitry is further to
transmit identification information for identifying said reception apparatus side to an information processing apparatus which provides the command, the information processing apparatus being the external network source, and acquire the command in response to the identification information from the information processing apparatus.

9. The reception apparatus according to claim 1, wherein the circuitry is further to acquire specification information for specifying an information processing apparatus, which provides the command, in response to the extracted trigger information, the information processing apparatus being the external network source, and access the information processing apparatus, which is specified by the acquired specification information, to acquire the command.

10. A reception method for a reception apparatus, comprising:

receiving an AV content;

extracting trigger information transmitted together with the AV content for rendering a downloaded application, which is to be executed in a linked relationship with the AV content;

automatically acquiring, by circuitry of the reception apparatus, a command for controlling operation of the downloaded application, the command being automatically acquired in response to processing the extracted trigger information, without user intervention, and from an external network source, the command being different from the trigger information; and controlling, by the circuitry of the reception apparatus, the operation of the downloaded application in response to the acquired command.

11. A non-transitory computer-readable storage medium storing a program for causing a computer to perform a method comprising:

receiving an AV content;

extracting trigger information transmitted together with the AV content for rendering a downloaded application, which is to be executed in a linked relationship with the AV content;

automatically acquiring, by the computer, a command for controlling operation of the application, the command being automatically acquired in response to processing the extracted trigger information, without user intervention, and from an external network source, the command being different from the trigger information; and controlling, by the computer, the operation of the downloaded application in response to the acquired command.

12. An information processing system, comprising:

a first information processing apparatus to provide a command for controlling operation of a downloaded application to be executed in a linked relationship with the AV content; and a second information processing apparatus to provide the application;

said reception apparatus including circuitry to receive the AV content, extract trigger information transmitted together with the AV content for rendering the downloaded application, automatically acquire the command, which is different from the trigger information, in response to processing the extracted trigger information, the command being automatically acquired without user intervention and from the first information processing apparatus which is an external network source, and control the operation of the downloaded application acquired from said second information processing apparatus in response to the command acquired from said first information processing apparatus, said first information processing apparatus including circuitry configured to provide the command in response to a first inquiry from said reception apparatus, said second information processing apparatus including circuitry configured to provide the application in response to a second inquiry from said reception apparatus.

13. The reception apparatus according to claim 1, wherein the circuitry is further to request the command for controlling the operation of the application from the external network source via a communication network.

14. The reception apparatus according to claim 13, wherein the circuitry is further to receive a digital television broadcast signal including the AV content and the trigger information.

15. The reception apparatus according to claim 1, wherein the command is separate from the trigger information and the application.

* * * * *